United States Patent
Guo

(10) Patent No.: US 11,949,488 B2
(45) Date of Patent: Apr. 2, 2024

(54) METHOD AND APPARATUS FOR REALIZING BEAM ALIGNMENT

(71) Applicant: ZTE Corporation, Shenzhen (CN)

(72) Inventor: Xiaojiang Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 195 days.

(21) Appl. No.: 17/616,395

(22) PCT Filed: Aug. 26, 2020

(86) PCT No.: PCT/CN2020/111483
§ 371 (c)(1),
(2) Date: Dec. 3, 2021

(87) PCT Pub. No.: WO2021/037080
PCT Pub. Date: Mar. 4, 2021

(65) Prior Publication Data
US 2022/0278736 A1    Sep. 1, 2022

(30) Foreign Application Priority Data
Aug. 30, 2019 (CN) .......................... 201910816368.8

(51) Int. Cl.
H04B 7/08 (2006.01)
(52) U.S. Cl.
CPC .................... H04B 7/088 (2013.01)
(58) Field of Classification Search
CPC .. H04B 7/0467; H04B 7/0479; H04B 7/0695; H04B 7/06952; H04B 7/06958; H04B 7/088
(Continued)

(56) References Cited

U.S. PATENT DOCUMENTS

2006/0164284 A1*  7/2006  Pauplis .............. H01Q 21/0025
                                                              342/194
2012/0119953 A1*  5/2012  Hosoya ..................... G01S 3/74
                                                              342/373
(Continued)

FOREIGN PATENT DOCUMENTS

CN    103353587 A    10/2013
CN    103383452 A    11/2013
(Continued)

OTHER PUBLICATIONS

European Patent Office. Extended European Search Report for EP Application No. 20855980.7, dated Sep. 6, 2022, pp. 1-18.
(Continued)

*Primary Examiner* — Young T. Tse
(74) *Attorney, Agent, or Firm* — Vivacqua Crane, PLLC

(57) ABSTRACT

A method and device for realizing beam alignment are disclosed. The method may include: when first signals are received by two analog subarrays having a same polarization using receiving beams with a same beam direction, acquiring the first signals and the phase center difference therebetween; maintaining the beam direction, changing the phase center difference between the two analog sub-arrays for the first time, and acquiring second signals and the first changed phase center difference; maintaining the beam direction, changing the phase center difference for the second time, and acquiring third signals and the second changed phase center difference; and estimating a DOA of a received signal according to the obtained information, and directing the centers of the receiving beams to the estimated DOA.

25 Claims, 6 Drawing Sheets

(58) Field of Classification Search
USPC .................................................. 375/260, 267
See application file for complete search history.

(56) References Cited

U.S. PATENT DOCUMENTS

| | | |
|---|---|---|
| 2018/0128892 A1 | 5/2018 | Granato |
| 2018/0219287 A1* | 8/2018 | Lyu ........................ H01Q 25/00 |
| 2018/0337739 A1 | 11/2018 | Petersson et al. |
| 2020/0403325 A1* | 12/2020 | Wu ...................... H01Q 21/061 |

FOREIGN PATENT DOCUMENTS

| | | | | |
|---|---|---|---|---|
| CN | 108020812 B | * | 11/2021 | .............. G01S 3/14 |
| EP | 2017061163 W | | 5/2017 | |
| JP | 2000031736 A | | 1/2000 | |
| JP | 2009020015 A | * | 1/2009 | |

OTHER PUBLICATIONS

International Searching Authority. International Search Report and Written Opinion for PCT Application No. PCT/CN2020/111483 and English translation, dated Nov. 16, 2020, pp. 1-11.

Kornaros, et al. A Novel Model for Direction Finding and Phase Center with Practical Considerations, IEEE Transactions on Antennas and Propagation, 2017, pp. 1-17.

Zhou, et al. Study on Method of Multiple Sub-array Beam-space in Sonar Imaging, China Academic Journal Electronic Publishing House, Jun. 1, 2018, pp. 1-68, Dalian, China.

* cited by examiner

METHOD AND APPARATUS FOR REALIZING BEAM ALIGNMENT

CROSS-REFERENCE TO RELATED APPLICATION

This application is a national stage filing under 35 U.S.C. § 371 of international application number PCT/CN2020/111483, filed on Aug. 26, 2020, which claims priority to Chinese patent application No. 201910816368.8 filed on Aug. 30, 2019. The contents of these applications are incorporated herein by reference in their entirety.

TECHNICAL FIELD

The embodiments of the present disclosure relate to but are not limited to communication technology, in particular to a method and a device for realizing beam alignment.

BACKGROUND

A 5G communication system generally adopts analog-digital hybrid beamforming, and a base station and a user equipment (UE) align beams through beam training, thus improving the Signal-to-Noise Ratio (SNR) of the received signals and increasing the coverage.

The current beam training methods can be roughly divided into two categories: first, hierarchical training, that is, to obtain rough beam pointing by wide beam scanning, and then to obtain more accurate beam pointing by narrow beam scanning in this wide beam; second, single layer training, that is, only narrow beam scanning is used in the observation range. Relatively, the first beam scanning method needs less scanning times and less overhead, but it may also have larger errors. The second scanning method is relatively more accurate, but it needs more scanning times and has high overhead. In fact, with respect to both hierarchical training and single layer training, the beam pointing accuracy is limited by the scanning interval. In order to obtain more accurate beam pointing, a smaller scanning interval is needed, but this will greatly increase system overhead and beam training time.

In order to reduce scanning overhead, the number of scanned beams is often limited, usually covering only hot spots. For non-hot spots (such as a UE under a tower, etc.), the signal can only enter from the sidelobe of the analog receiving beam during beam training, so it is difficult to implement a main lobe alignment through beam training. If more scanning beams are set in non-hot spots to implement the main lobe alignment, the system overhead and time for beam alignment will be greatly increased.

SUMMARY

The embodiments of the present disclosure provide a method and a device for realizing beam alignment, which can reduce system overhead and time for beam alignment, and improve accuracy of beam alignment.

An embodiment of the present disclosure provides a method for realizing beam alignment, which may include:
in response to a reception of first signals with effective signal strengths through two analog subarrays with a same polarization mode by adopting receiving beams having a same beam direction, acquiring the first signals received by the two analog subarrays, and a difference between phase centers of the two analog subarrays;
keeping the beam directions of the receiving beams of the two analog subarrays unchanged, performing a first change of the difference between phase centers of the two analog subarrays, and acquiring second signals received by the two analog subarrays and a difference between the phase centers after the first change of the two analog subarrays;
keeping the beam directions of the receiving beams of the two analog subarrays unchanged, performing a second change of the difference between phase centers of the two analog subarrays, and acquiring third signals received by the two analog subarrays and a difference between the phase centers after the second change of the two analog subarrays;
estimating a Direction Of Arrival (DOA) of a receiving signal, according to the first signals, the second signals and the third signals received by the two analog subarrays, the difference between phase centers before the first change, the difference between phase centers after the first change and the difference between phase centers after the second change; and directing a center of a receiving beam to the estimated DOA.

An embodiment of the present disclosure provides a method for realizing beam alignment, which may include:
in response to a reception of first signals with effective signal strengths through a first group of analog subarrays and a second group of analog subarrays by adopting receiving beams having a same beam direction, acquiring the first signals received by the first group of analog subarrays, the first signals received by the second group of analog subarrays, a difference between phase centers of two analog subarrays in the first group of analog subarrays, and a difference between phase centers of two analog subarrays in the second group of analog subarrays; where each of the first and second group of analog subarrays may include two analog subarrays with a same polarization mode;
keeping the beam directions of the receiving beams of the first group of analog subarrays and the second group of analog subarrays unchanged, performing a first change of the difference between phase centers of the first group of analog subarrays, acquiring second signals received by the first group of analog subarrays and a difference between phase centers after the first change of the first group of analog subarrays, performing a first change of the difference between phase centers of the second group of analog subarrays, and acquiring second signals received by the second group of analog subarrays and a difference between phase centers after the first change of the second group of analog subarrays;
estimating a Direction Of Arrival (DOA) of a receiving signal, and directing a center of a receiving beam to the estimated DOA, according to the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays.

An embodiment of the present disclosure provides a method for realizing beam alignment, which may include:
in response to a reception of first signals with effective signal strengths through a first group of analog subarrays, a second group of analog subarrays and a third group of analog subarrays by adopting receiving beams having a same beam direction, acquiring the first signals received by the first group of analog subarrays, the first signals received by the second group of analog subarrays, the first signals received by the third group of analog subarrays, a difference between phase centers of two analog subarrays in the first group of analog subarrays, a difference between phase centers of two analog subarrays in the second group of analog subarrays, and a difference between phase centers of two analog subarrays in the third group of analog subarrays; where each of the first, second and third group of analog subarrays may include two analog subarrays with a same polarization mode;

keeping the beam directions of the receiving beams of the first group of analog subarrays, the second group of analog subarrays and the third group of analog subarrays unchanged, performing a change of the difference between phase centers of the first group of analog subarrays, acquiring second signals received by the first group of analog subarrays and a difference between phase centers after change of the first group of analog subarrays, performing a change of the difference between phase centers of the second group of analog subarrays, acquiring second signals received by the second group of analog subarrays and a difference between phase centers after change of the second group of analog subarrays, and performing a change of the difference between phase centers of the third group of analog subarrays, acquiring second signals received by the third group of analog subarrays and a difference between phase centers after change of the third group of analog subarrays;

estimating a Direction Of Arrival (DOA) of a receiving signal, and directing a center of a receiving beam to the estimated DOA, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays, the first signals and the second signals received by the third group of analog subarrays, the difference between phase centers before change and the difference between phase centers after change of the third group of analog subarrays.

An embodiment of the present disclosure provides a device for realizing beam alignment, which may include a processor, and a computer-readable storage medium storing instructions which, when executed by the processor, cause the processor to perform any one of above methods for realizing beam alignment.

An embodiment of the present disclosure provides a computer-readable storage medium storing instructions which, when executed by the processor, cause the processor to perform any one of above methods for realizing beam alignment.

An embodiment of the present disclosure provides a device for realizing beam alignment, which may include:

a first acquisition module configured to: in response to a reception of first signals with effective signal strengths through two analog subarrays with a same polarization mode by adopting receiving beams having a same beam direction, acquire the first signals received by the two analog subarrays, and a difference between phase centers of the two analog subarrays;

keep the beam directions of the receiving beams of the two analog subarrays unchanged, perform a first change of the difference between phase centers of the two analog subarrays, and acquire second signals received by the two analog subarrays and a difference between the phase centers after the first change of the two analog subarrays;

keep the beam directions of the receiving beams of the two analog subarrays unchanged, perform a second change of the difference between phase centers of the two analog subarrays, and acquire third signals received by the two analog subarrays and a difference between the phase centers after the second change of the two analog subarrays;

a first beam alignment module configured to: estimate a Direction Of Arrival (DOA) of a receiving signal, according to the first signals, the second signals and the third signals received by the two analog subarrays, the difference between phase centers before the first change, the difference between phase centers after the first change and the difference between phase centers after the second change; and direct a center of a receiving beam to the estimated DOA.

An embodiment of the present disclosure provides a device for realizing beam alignment, which may include:

a second acquisition module configured to: in response to a reception of first signals with effective signal strengths through a first group of analog subarrays and a second group of analog subarrays by adopting receiving beams having a same beam direction, acquire the first signals received by the first group of analog subarrays, the first signals received by the second group of analog subarrays, a difference between phase centers of two analog subarrays in the first group of analog subarrays, and a difference between phase centers of two analog subarrays in the second group of analog subarrays; where each of the first and second group of analog subarrays may include two analog subarrays with a same polarization mode;

keep the beam directions of the receiving beams of the first group of analog subarrays and the second group of analog subarrays unchanged, perform a first change of the difference between phase centers of the first group of analog subarrays, acquire second signals received by the first group of analog subarrays and a difference between phase centers after the first change of the first group of analog subarrays, perform a first change of the difference between phase centers of the second group of analog subarrays, and acquire second signals received by the second group of analog subarrays and a difference between phase centers after the first change of the second group of analog subarrays;

a second beam alignment module configured to: estimate a Direction Of Arrival (DOA) of a receiving signal, and direct a center of a receiving beam to the estimated DOA, according to the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays.

An embodiment of the present disclosure provides a device for realizing beam alignment, which may include:
- a third acquisition module configured to: in response to a reception of first signals with effective signal strengths through a first group of analog subarrays, a second group of analog subarrays and a third group of analog subarrays by adopting receiving beams having a same beam direction, acquire the first signals received by the first group of analog subarrays, the first signals received by the second group of analog subarrays, the first signals received by the third group of analog subarrays, a difference between phase centers of two analog subarrays in the first group of analog subarrays, a difference between phase centers of two analog subarrays in the second group of analog subarrays, and a difference between phase centers of two analog subarrays in the third group of analog subarrays; where each of the first, second and third group of analog subarrays may include two analog subarrays with a same polarization mode;
- keep the beam directions of the receiving beams of the first group of analog subarrays, the second group of analog subarrays and the third group of analog subarrays unchanged, perform a change of the difference between phase centers of the first group of analog subarrays, acquire second signals received by the first group of analog subarrays and a difference between phase centers after change of the first group of analog subarrays, perform a change of the difference between phase centers of the second group of analog subarrays, acquire second signals received by the second group of analog subarrays and a difference between phase centers after change of the second group of analog subarrays, and perform a change of the difference between phase centers of the third group of analog subarrays, acquire second signals received by the third group of analog subarrays and a difference between phase centers after change of the third group of analog subarrays;
- estimate a Direction Of Arrival (DOA) of a receiving signal, and direct a center of a receiving beam to the estimated DOA, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays, the first signals and the second signals received by the third group of analog subarrays, the difference between phase centers before change and the difference between phase centers after change of the third group of analog subarrays.

An embodiment of the present disclosure may include: in response to a reception of first signals with effective signal strengths through two analog subarrays with a same polarization mode by adopting receiving beams having a same beam direction, acquiring the first signals received by the two analog subarrays, and a difference between phase centers of the two analog subarrays; keeping the beam directions of the receiving beams of the two analog subarrays unchanged, performing a first change of the difference between phase centers of the two analog subarrays, and acquiring second signals received by the two analog subarrays and a difference between the phase centers after the first change of the two analog subarrays; keeping the beam directions of the receiving beams of the two analog subarrays unchanged, performing a second change of the difference between phase centers of the two analog subarrays, and acquiring third signals received by the two analog subarrays and a difference between the phase centers after the second change of the two analog subarrays; and estimating a Direction Of Arrival (DOA) of a receiving signal, according to the first signals, the second signals and the third signals received by the two analog subarrays, the difference between phase centers before the first change, the difference between phase centers after the first change and the difference between phase centers after the second change; and directing a center of a receiving beam to the estimated DOA. According to the embodiments of the present disclosure, the beam alignment is realized based on the change of the difference between the phase centers of two analog subarrays with the same polarization mode, and the beam alignment can be realized only by carrying out three measurements, so that the system overhead and the time for beam alignment are reduced; and the beam alignment is realized by estimating the DOA, the estimated DOA is not limited by the scanning interval, thus the accuracy of beam alignment is improved.

An embodiment of the present disclosure may include: in response to a reception of first signals with effective signal strengths through a first group of analog subarrays and a second group of analog subarrays by adopting receiving beams having a same beam direction, acquiring the first signals received by the first group of analog subarrays, the first signals received by the second group of analog subarrays, a difference between phase centers of two analog subarrays in the first group of analog subarrays, and a difference between phase centers of two analog subarrays in the second group of analog subarrays; where each of the first and second group of analog subarrays may include two analog subarrays with a same polarization mode; keeping the beam directions of the receiving beams of the first group of analog subarrays and the second group of analog subarrays unchanged, performing a first change of the difference between phase centers of the first group of analog subarrays, acquiring second signals received by the first group of analog subarrays and a difference between phase centers after the first change of the first group of analog subarrays, performing a first change of the difference between phase centers of the second group of analog subarrays, and acquiring second signals received by the second group of analog subarrays and a difference between phase centers after the first change of the second group of analog subarrays; estimating a Direction Of Arrival (DOA) of a receiving signal, and directing a center of a receiving beam to the estimated DOA, according to the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays. According to the embodiments of the present disclosure, the beam alignment is realized based on the change of the difference between the phase centers of two groups of analog subarrays, and the beam alignment can be realized only by carrying out two measurements, so that the system overhead and the time for beam alignment are reduced; and the beam alignment is realized by estimating the DOA, the estimated DOA is not limited by the scanning interval, thus the accuracy of beam alignment is improved.

Other features and advantages of embodiments of the present disclosure will be set forth in the following description, and at least in part will be obvious from the description, or may be learned by practice of embodiments of the present disclosure. The objects and other advantages of embodiments of the present disclosure can be realized and obtained by the structures particularly pointed out in the description, claims and drawings.

BRIEF DESCRIPTION OF DRAWINGS

The attached drawings are used to provide a further understanding of the technical schemes of the embodiments of the present disclosure, and constitute a part of the specification, together with the embodiments of the present disclosure, to explain the technical scheme of the embodiments of the present disclosure, and do not constitute a restriction on the technical scheme of the embodiments of the present disclosure.

DETAILED DESCRIPTION

Embodiments of the present disclosure will be described in detail below with reference to the accompanying drawings. It should be noted that the embodiments of the present disclosure and the features in an embodiments can be arbitrarily combined with each other without conflict.

The steps shown in the flowchart of the drawings may be performed in a computer system which includes such as a set of computer-executable instructions. Although a logical order is shown in the flowchart, in some cases, the steps shown or described may be performed in a different order therefrom.

Figure 1:
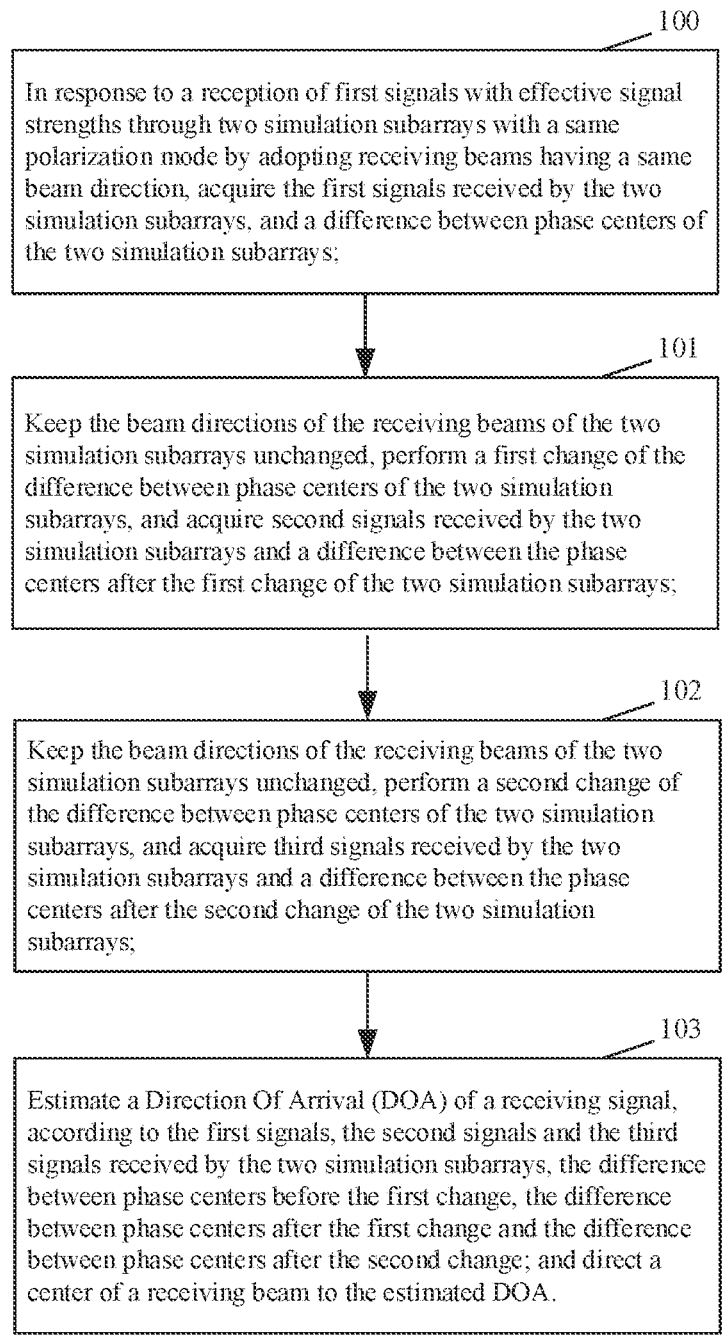
FIG. 1 is a flowchart of a method for realizing beam alignment according to an embodiment of the present disclosure.

Referring to FIG. 1, an embodiment of the present disclosure provides a method for realizing beam alignment, which includes the following steps.

At step 100, in response to a reception of first signals with effective signal strengths through two analog subarrays with a same polarization mode by adopting receiving beams having a same beam direction, the first signals received by the two analog subarrays, and a difference between phase centers of the two analog subarrays, are acquired.

In an embodiment of the present disclosure, when adopting analog-digital hybrid beamforming, each digital channel is connected with an analog subarray, and each analog subarray is composed of a plurality of analog radiators, and the phases of these radiators can be adjusted by a phase shifter.

In an embodiment of the present disclosure, the first signal with effective strength refers to a first signal with a signal-to-noise ratio greater than or equal to a preset threshold.

Figure 2:
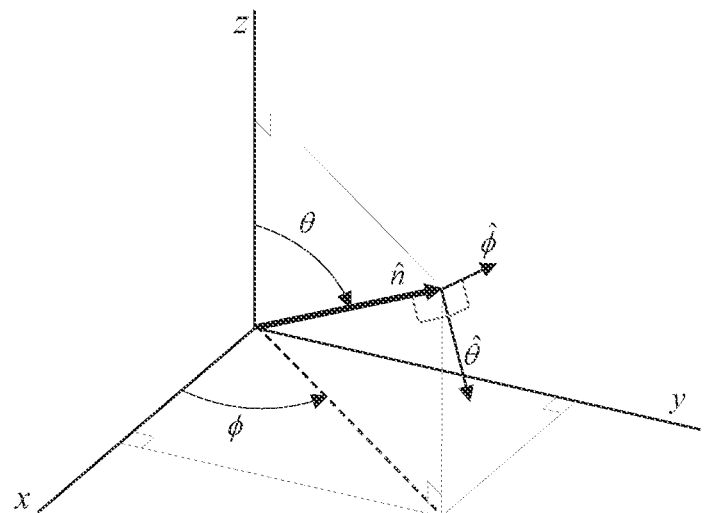
FIG. 2 is a schematic diagram of a spatial angle according to an embodiment of the present disclosure.

In an embodiment of the present disclosure, it is assumed that the spatial angle diagram is as shown in FIG. 2, the target Direction Of Arrival (i.e., DOA) is n̂, a corresponding azimuth is ϕ, a zenith angle is θ, and a wavelength of the carrier wave is λ. Assuming that the phase center of the nth analog subarray is $(x_n, y_n, z_n)$, if an origin of coordinates is taken as a reference point, a phase shifting of the phase center under a far-field condition can be expressed by formula (1).

$$w_n = \exp\left(j\frac{2\pi}{\lambda}(x_n \sin\theta \cos\phi + y_n \sin\theta \sin\phi + z_n \cos\theta)\right) \quad (1)$$

Assuming that the phase centers of the two analog subarrays are $(x_1, y_1, z_1)$ and $(x_2, y_2, z_2)$ respectively, and the received first signals are $r_1(k)$ and $r_2(k)$ respectively, then the difference between the phase centers of the two analog subarrays is $(\Delta x_1, \Delta y_1, \Delta z_1) = (x_1, y_1, z_1) - (x_2, y_2, z_2)$, and the formula (2) is obtained.

$$\frac{r_1(k) \cdot r_2^*(k)}{|r_1(k) \cdot r_2^*(k)|} = \exp\left[\frac{j2\pi}{\lambda}(\Delta x_1 \sin\theta \cos\phi + \Delta y_1 \sin\theta \sin\phi + \Delta z_1 \cos\theta)\right] \quad (2)$$

At step 101, the beam directions of the receiving beams of the two analog subarrays are kept unchanged, a first change of the difference between phase centers of the two analog subarrays is performed, and second signals received by the two analog subarrays and a difference between the phase centers after the first change of the two analog subarrays are acquired.

Assuming that the phase centers of the two analog subarrays are $(x_1', y_1', z_1')$ and $(x_2', y_2', z_2')$ respectively after the first change of the difference between phase centers of the two analog subarrays, and the received second signals are $r_1'(k)$ and $r_2'(k)$ respectively, then the difference between the phase centers after the first change of the two analog subarrays is $(\Delta x_1', \Delta y_1', \Delta z_1') = (x_1', y_1', z_1') - (x_2', y_2', z_2')$, and the formula (3) is obtained.

$$\frac{r_1'(k) \cdot r_2'^*(k)}{|r_1'(k) \cdot r_2'^*(k)|} = \quad (3)$$

-continued $$\exp\left[\frac{j2\pi}{\lambda}(\Delta x_1' \sin\theta\cos\phi + \Delta y_1' \sin\theta\sin\phi + \Delta z_1' \cos\theta)\right]$$

In an embodiment of the present disclosure, the difference between the phase centers of the two analog subarrays can be changed by changing the phase centers of both of the two analog subarrays, or by changing the phase center of one of the two analog subarrays.

In an embodiment of the present disclosure, the phase center can be changed in any of the following modes.

In the first mode, some radiators in a analog subarray are directly turned off, which will cause the phase center of the analog subarray to shift. In an implementation, a difference between phase centers of the two analog subarrays is changed by turning off part of radiators of one of the analog subarrays or part of radiators of the two analog subarrays.

Figure 5:
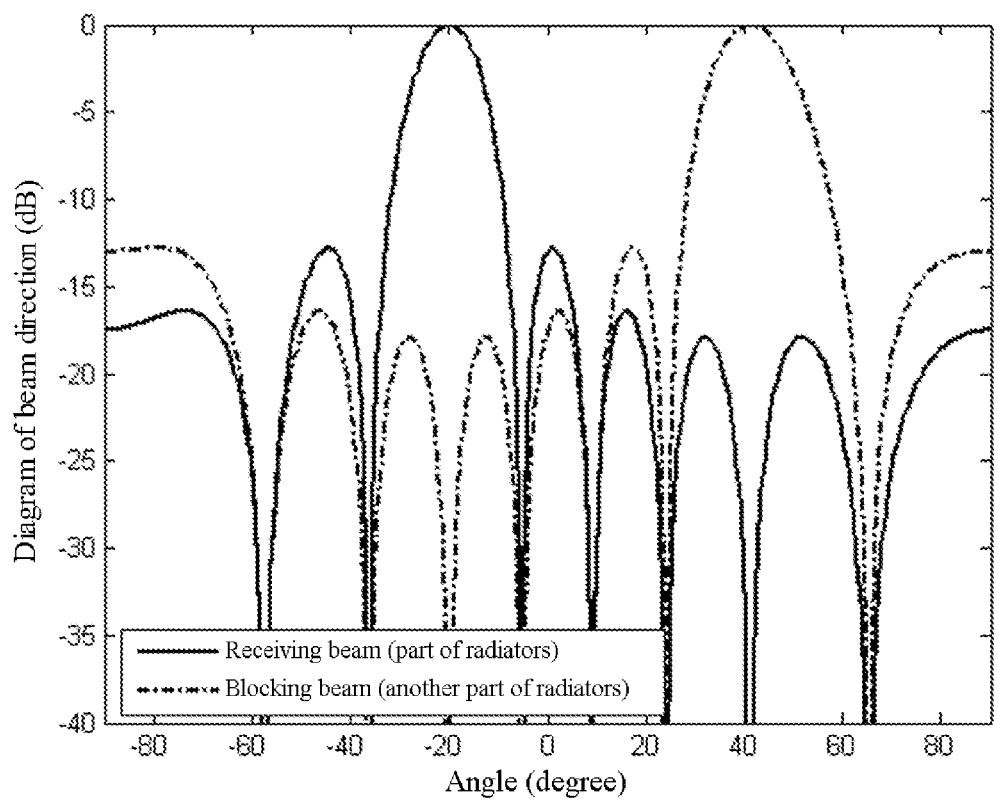
FIG. 5 is a schematic diagram of directions formed by two parts of radiators of analog subarrays, according to an embodiment of the present disclosure.

For example, as shown in FIG. 5, the filled circle in FIG. 5 represents the equivalent phase center of each analog subarray. FIG. 5(a) shows the schematic diagram of the phase center before changing, FIG. 5(b) shows the schematic diagram of changing the phase center in an azimuth dimension, and FIG. 5(c) shows the schematic diagram of changing the phase center in a vertical dimension.

In FIG. 5(b), the last column of radiators of the first analog subarray and the first column of radiators of the second analog subarray are turned off, thus causing the difference between phase centers to change in the azimuth dimension. In FIG. 5(c), the last row of radiators of the first analog subarray and the first row of radiators of the second analog subarray are turned off, thus causing the difference between phase centers to change in the vertical dimension.

Figure 6:
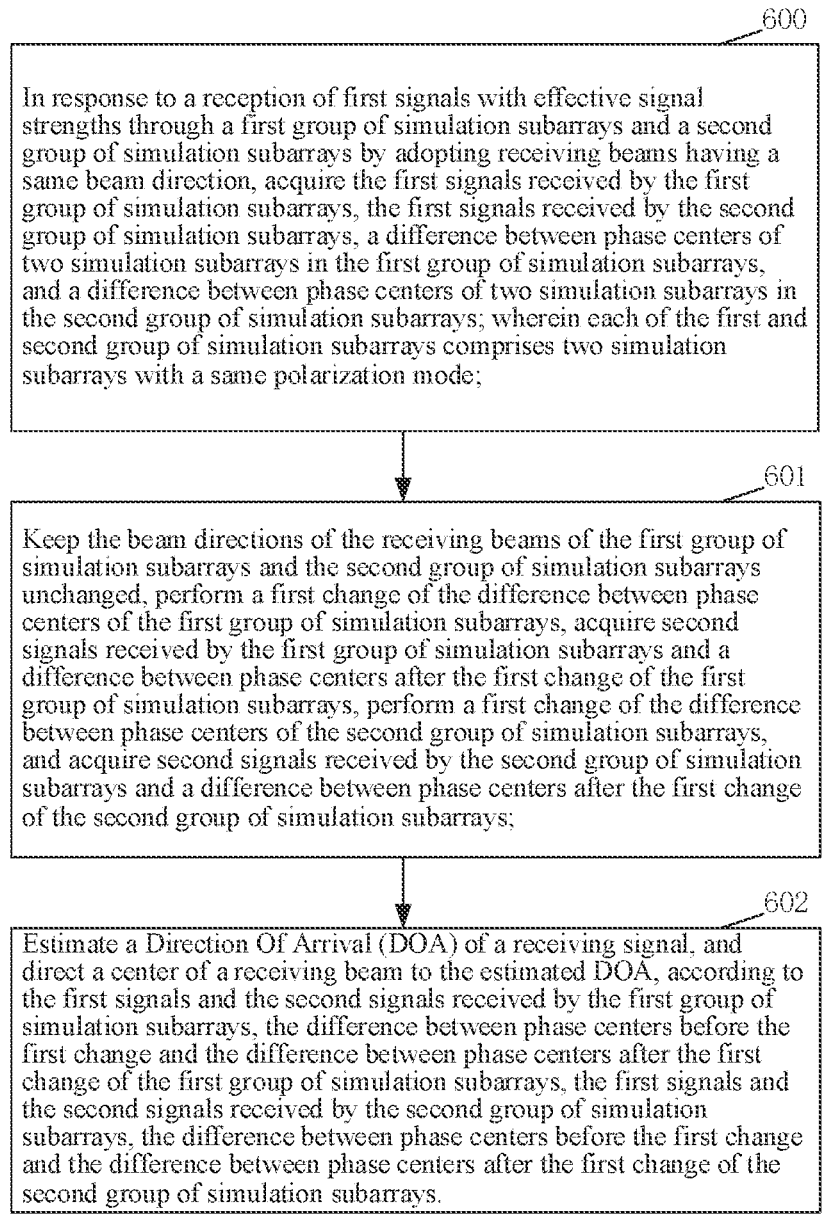
FIG. 6 is a flowchart of a method for realizing beam alignment according to another embodiment of the present disclosure.

In the second mode, an equivalent signal processing can be adopted for radiators that cannot be properly turned off (such as analog radiators only subjected to constant modulus phase modulation), so that the radiators that need to be turned off can form a beam nulling or a low sidelobe in the observable area or point to the non-observable area after beamforming. As shown in FIG. 6, some radiators of the analog subarray form an effective receiving beam pointing to the observable area, while the other radiators form a blocking beam pointing to the non-observable area, so that the radiators forming the blocking beam are equivalent to being turned off, thus causing the change of the equivalent phase center of the analog subarray. That is to say, the difference between the phase centers of the two analog subarrays can be changed by forming a blocking beam pointing to the non-observable area, or forming a beam nulling or low sidelobe in the observable area, by the radiators that need to be turned off in one or both analog subarrays.

At step 102, the beam directions of the receiving beams of the two analog subarrays are kept unchanged, a second change of the difference between phase centers of the two analog subarrays is performed, and third signals received by the two analog subarrays and a difference between the phase centers after the second change of the two analog subarrays are acquired.

Assuming that the phase centers of the two analog subarrays are $(x_1'', y_1'', z_1'')$ and $(x_2'', y_2'', z_2'')$ respectively after the second change of the difference between phase centers of the two analog subarrays, and the received third signals are $r_1''(k)$ and $r_2''(k)$ respectively, then the difference between the phase centers after the second change of the two analog subarrays is $(\Delta x_1'', \Delta y_1'', \Delta z_1'')=(x_1'', y_1'', z_1'')-(x_2'', y_2'', z_2'')$, and the formula (4) is obtained.

$$\frac{r_1''(k) \cdot r_2''^*(k)}{|r_1''(k) \cdot r_2''^*(k)|} = \quad (4)$$

$$\exp\left[\frac{j2\pi}{\lambda}(\Delta x_1'' \sin\theta\cos\phi + \Delta y_1'' \sin\theta\sin\phi + \Delta z_1'' \cos\theta)\right]$$

It should be noted that the difference between the phase centers of the two analog subarrays after the first change is different from the difference between the phase centers after the second change.

In an embodiment of the present disclosure, the first change of a difference between phase centers of the two analog subarrays is performed on a first dimension of the two analog subarrays; and the second change of a difference between phase centers of the two analog subarrays is performed on a second dimension of the two analog subarrays.

Alternatively, the first change of a difference between phase centers of the two analog subarrays is performed on a second dimension of the two analog subarrays; and the second change of a difference between phase centers of the two analog subarrays is performed on a first dimension of the two analog subarrays.

Alternatively, the first change of a difference between phase centers of the two analog subarrays is performed on a first and second dimensions of the two analog subarrays; and the second change of a difference between phase centers of the two analog subarrays is performed on one or both of the first and second dimensions of the two analog subarrays.

Alternatively, the first change of a difference between phase centers of the two analog subarrays is performed on one or both of a first and second dimensions of the two analog subarrays; and the second change of a difference between phase centers of the two analog subarrays is performed on the first and second dimensions of the two analog subarrays.

The first dimension may be an azimuth dimension and the second dimension may be a vertical dimension. Alternatively, the first dimension may be a vertical dimension and the second dimension may be an azimuth dimension. The first dimension and the second dimension may also be other dimensions, which are not limited by the embodiments of the present disclosure.

In an embodiment of the present disclosure, the first signals, the second signals and the third signals can be received at different time units. That is, step 100, step 101 and step 102 are executed in different time units, respectively. The time unit may be a symbol or a time slot.

At step 103, a DOA of a receiving signal is estimated, according to the first signals, the second signals and the third signals received by the two analog subarrays, the difference between phase centers before the first change, the difference between phase centers after the first change and the difference between phase centers after the second change; and a center of a receiving beam is directed to the estimated DOA.

In an example, the DOA of the receiving signal can be estimated by any of the following methods.

In a first method, a first objective function is determined, according to the first signals, the second signals and the third signals received by the two analog subarrays, the difference between phase centers before the first change, the difference between phase centers after the first change and the difference between phase centers after the second change; all desirable DOAs are traversed to obtain a value of the first objective function corresponding to each of the desirable DOAs, and a DOA with a smallest value of the first objective function is taken as the estimated DOA.

In an illustrative example, based on formulas (2) to (4), the first objective function can be determined as:

$$\left|\frac{r_1(k)\cdot r_2^*(k)}{|r_1(k)\cdot r_2^*(k)|} - \exp\left[\frac{j2\pi}{\lambda}(\Delta x_1 \sin\theta \cos\phi + \Delta y_1 \sin\theta \sin\phi + \Delta z_1 \cos\theta)\right]\right| +$$

$$\left|\frac{r_1'(k)\cdot r_2'^*(k)}{|r_1'(k)\cdot r_2'^*(k)|} - \exp\left[\frac{j2\pi}{\lambda}(\Delta x_1' \sin\theta \cos\phi + \Delta y_1' \sin\theta \sin\phi + \Delta z_1' \cos\theta)\right]\right| +$$

$$\left|\frac{r_1''(k)\cdot r_2''^*(k)}{|r_1''(k)\cdot r_2''^*(k)|} - \exp\left[\frac{j2\pi}{\lambda}(\Delta x_1'' \sin\theta \cos\phi + \Delta y_1'' \sin\theta \sin\phi + \Delta z_1'' \cos\theta)\right]\right|$$

or, $$\left(\frac{r_1(k)\cdot r_2^*(k)}{|r_1(k)\cdot r_2^*(k)|} - \exp\left[\frac{j2\pi}{\lambda}(\Delta x_1 \sin\theta \cos\phi + \Delta y_1 \sin\theta \sin\phi + \Delta z_1 \cos\theta)\right]\right)^2 +$$

$$\left(\frac{r_1'(k)\cdot r_2'^*(k)}{|r_1'(k)\cdot r_2'^*(k)|} - \exp\left[\frac{j2\pi}{\lambda}(\Delta x_1' \sin\theta \cos\phi + \Delta y_1' \sin\theta \sin\phi + \Delta z_1' \cos\theta)\right]\right)^2 +$$

$$\left(\frac{r_1''(k)\cdot r_2''^*(k)}{|r_1''(k)\cdot r_2''^*(k)|} - \exp\left[\frac{j2\pi}{\lambda}(\Delta x_1'' \sin\theta \cos\phi + \Delta y_1'' \sin\theta \sin\phi + \Delta z_1'' \cos\theta)\right]\right)^2$$

In a second method, an equation set with $\theta$ and $\phi$ as unknowns is established, according to the first signals, the second signals and the third signals received by the two analog subarrays, the difference between phase centers before the first change, the difference between phase centers after the first change and the difference between phase centers after the second change, where $\theta$ is a zenith angle of the DOA, $\phi$ is an azimuth of the DOA; and $\theta$ and $\phi$ are obtained by solving the equation set.

In an illustrative example, establishing an equation set with $\theta$ and $\phi$ as unknowns includes: determining a first difference value and a second difference value, according to the difference between phase centers before the first change, the difference between phase centers after the first change and the difference between phase centers after the second change; and establishing an equation set with $\theta$ and $\phi$ as unknowns, according to the first signals, the second signals, the third signals, the first difference value and the second difference value.

The first difference value is a difference value between the difference between phase centers after the first change and the difference between phase centers before the first change, and the second difference value is a difference value between the difference between phase centers after the second change and the difference between phase centers before the first change.

Alternatively, the first difference value is a difference value between the difference between phase centers before the first change and the difference between phase centers after the first change, and the second difference value is a difference value between the difference between phase centers after the second change and the difference between phase centers after the first change.

Alternatively, the first difference value is a difference value between the difference between phase centers before the first change and the difference between phase centers after the second change, and the second difference value is a difference value between the difference between phase centers after the first change and the difference between phase centers after the second change.

In an example, based on formulas (2) to (4), by taking a measurement result before changing the phase centers as a reference signal, the following equation set can be established:

$$\begin{cases} \arg\{r_1'(k)\cdot r_2'^*(k)\cdot [r_1(k)\cdot r_2^*(k)]^*\} + 2n'\pi = \\ \frac{2\pi}{\lambda}((\Delta x_1' - \Delta x_1)\sin\theta\cos\phi + (\Delta y_1' - \Delta y_1)\sin\theta\sin\phi + (\Delta z_1' - \Delta z_1)\cos\theta); \\ \arg\{r_1''(k)\cdot r_2''^*(k)\cdot [r_1(k)\cdot r_2^*(k)]^*\} + 2n''\pi \\ = \frac{2\pi}{\lambda}((\Delta x_1'' - \Delta x_1)\sin\theta\cos\phi + (\Delta y_1'' - \Delta y_1)\sin\theta\sin\phi + (\Delta z_1'' - \Delta z_1)\cos\theta) \end{cases};$$

where n' and n" are integers.

Of course, a measurement result after the first change between the phase centers can also be used as a reference signal, or a measurement result after the second change between the phase centers can be used as a reference signal, which is not limited by the embodiments of the present disclosure.

The above equation set is solved as follows:

let $a = \frac{\lambda}{2\pi}\cdot \arg\{r_1'(k)\cdot r_2'^*(k)\cdot [r_1(k)\cdot r_2^*(k)]^*\} + n'\lambda,$ $b = \frac{\lambda}{2\pi}\cdot \arg\{r_1''(k)\cdot r_2''^*(k)\cdot [r_1(k)\cdot r_2^*(k)]^*\} + n''\lambda,$ then, the above equation set can be transformed into:

$(\Delta x_1' - \Delta x_1)\sin\theta\cos\phi + (\Delta y_1' - \Delta y_1)\sin\theta\sin\phi + (\Delta z_1' - \Delta z_1)\cos\theta = a$ $(\Delta x_1'' - \Delta x_1)\sin\theta\cos\phi + (\Delta y_1'' - \Delta y_1)\sin\theta\sin\phi + (\Delta z_1'' - \Delta z_1)\cos\theta = b$ when $(\Delta x_1'' - \Delta x_1)(\Delta y_1' - \Delta y_1) \neq (\Delta x_1' - \Delta x_1)(\Delta y_1'' - \Delta y_1),$ $$\theta = \arccos\frac{-a_2 - \sqrt{a_2^2 - 4a_1 a_3}}{2a_1};$$

where $a_1 = k_1^2((\Delta x_1' - \Delta x_1)^2 + (\Delta z_1' - \Delta z_1)^2) + k_3^2 k_4^2 + 2k_1 k_3 (\Delta y_1' - \Delta y_1)(\Delta z_1' - \Delta z_1)$ $a_2 = 2k_2k_3k_4^2 - 2k_1(\Delta y_1' - \Delta y_1)(ak_3 - (\Delta z_1' - \Delta z_1)k_2) + 2ak_1^2(\Delta z_1' - \Delta z_1)$;

$a_3 = k_1(a^2 - (\Delta x_1' - \Delta x_1)^2) + k_2^2 k_4^2 - 2ak_1k_2(\Delta y_1' - \Delta y_1)$ $k_1 = (\Delta x_1'' - \Delta x_1)(\Delta y_1' - \Delta y_1) - (\Delta x_1' - \Delta x_1)(\Delta y'' - \Delta y_1)$ $k_2 = a(\Delta x'' - \Delta x_1) - b(\Delta_1' - \Delta x_1)$, $k_3 = (\Delta x_1' - \Delta x_1)(\Delta z_1'' - \Delta z_1) - (\Delta x_1'' - \Delta x_1)(\Delta z_1' - \Delta z_1)$;

$k_4 = (\Delta x_1' - x_1)^2 + (\Delta y_1' - \Delta y_1)^2$ then, substituting θ into the equation set to obtain φ.

In the second method, the process of solving equation sets directly is obviously complicated. In order to simplify the process of solving equation sets, the difference between the phase centers of two analog subarrays can be changed according to certain rules.

For example, when all of the first signals, the second signals, the third signals, the difference between phase centers before the first change, the difference between phase centers after the first change and the difference between phase centers after the second change are values in a global coordinate system, the difference can be changed according to the following rules:

the coordinates on the first and second dimensions of the first difference value in the global coordinate system are 0, and the coordinate on the third dimension of the second difference value in the global coordinate system is 0;

alternatively, the coordinates on the first and second dimensions of the second difference value in the global coordinate system are 0, and the coordinate on the third dimension of the first difference value in the global coordinate system is 0.

Globe Coordinate System (GCS) refers to a coordinate system defined in a standard, which is a three-dimensional coordinate system.

For example, after changing the difference between the phase centers of two analog subarrays according to such rules, the equation set established above can be simplified as $(\Delta y' - \Delta y_1) \sin \theta \sin \phi = a$ $(\Delta x_1'' - \Delta x_1) \sin \theta \cos \phi + (\Delta z_1'' - \Delta z_1) \cos \theta = b$ $$\theta = \arccos \frac{b(\Delta z_1'' - \Delta z_1) - \sqrt{[b(\Delta z_1'' - \Delta z_1)]^2 - [(\Delta z_1'' - \Delta z_1)^2 + (\Delta x_1'' - \Delta x_1)^2]\left[b^2 - (\Delta x_1'' - \Delta x_1)^2 + \frac{a^2(\Delta x_1'' - \Delta x_1)^2}{(\Delta y_1' - \Delta y_1)}\right]}}{(\Delta z_1'' - \Delta z_1)^2 + (\Delta x_1'' - \Delta x_1)^2};$$

then, substituting θ into the equation set to obtain φ.

For another example, when all of the first signals, the second signals, the third signals, the difference between phase centers before the first change, the difference between phase centers after the first change and the difference between phase centers after the second change are values in a local coordinate system, the difference can be changed according to the following rules:

the coordinate on the first dimension of the first difference value in the local coordinate system is 0, and the coordinate on the second dimension of the second difference value in the local coordinate system is 0;

alternatively, the coordinate on the first dimension of the second difference value in the local coordinate system is 0, and the coordinate on the second dimension of the first difference value in the local coordinate system is 0.

The Local Coordinate System (LCS) is a two-dimensional coordinate system. In this case, the antenna array (that is, the analog subarray) needs to be located in the plane of the coordinate system to realize the above calculation.

For example, after changing the difference between the phase centers of two analog subarrays according to such rules, the equation set established above can be simplified as $(\Delta y_1' - \Delta y_1) \sin\theta \sin\phi = a$ $(\Delta z_1' - \Delta z_1) \cos\theta = b$, and be solved as:

$\theta = \arccos \dfrac{b}{\Delta z_1'' - \Delta z_1}$ $\phi = \arcsin \dfrac{a}{(\Delta y_1' - \Delta y_1) \sin \theta}.$ In another embodiment of the present disclosure, before estimating a DOA of a receiving signal, the method further includes: keeping the beam directions of the receiving beams of the two analog subarrays unchanged, performing a third change of the difference between phase centers of the two analog subarrays, and acquiring fourth signals received by the two analog subarrays and a difference between the phase centers after the third change of the two analog subarrays.

Estimating a DOA of a receiving signal includes: estimating a DOA of a receiving signal, according to the first signals, the second signals, the third signals and the fourth signals received by the two analog subarrays, the difference between phase centers before the first change, the difference between phase centers after the first change, the difference between phase centers after the second change and the difference between phase centers after the third change.

Assuming that the phase centers of the two analog subarrays are $(x_1''', y_1''', z_1''')$ and $(x_2''', y_1''', z_2''')$ respectively after the third change of the difference between phase centers of the two analog subarrays, and the received fourth signals are $r_1'''(k)$ and $r_2'''(k)$ respectively, then the difference between the phase centers after the third change of the two analog subarrays is $(\Delta_1''', \Delta y_1''', \Delta z_1''') = (x_1''', y_1''', z_1''') - (x_2''', y_2''', z_1''')$, and the formula (5) is obtained.

$$\frac{r_1'''(k) \cdot r_2'''^*(k)}{|r_1'''(k) \cdot r_2'''^*(k)|} = \tag{5}$$

-continued $$\exp\left[\frac{j2\pi}{\lambda}(\Delta x_1''' \sin\theta \cos\phi + \Delta y_1''' \sin\theta \sin\phi + \Delta z_1''' \cos\theta)\right]$$

It should be noted that the difference between the phase centers of the two analog subarrays after the first change is different from the difference between the phase centers after the second change, and is different from the difference between the phase centers after the third change.

In an example, estimating a DOA of a receiving signal includes: establishing an equation set with $\sin\theta \cos\phi$, $\sin\theta \sin\phi$ and $\cos\theta$ as unknowns, according to the first signals, the second signals, the third signals and the fourth signals received by the two analog subarrays, the difference between phase centers before the first change, the difference between phase centers after the first change, the difference between phase centers after the second change and the difference between phase centers after the third change, where $\theta$ is a zenith angle of the DOA, $\phi$ is an azimuth of the DOA; obtaining $\sin\theta \cos\phi$, $\sin\theta \sin\phi$ and $\cos\theta$ by solving the equation set; and calculating $\theta$ and $\phi$ according to $\sin\theta \cos\phi$, $\sin\theta \sin\phi$ and $\cos\theta$.

In an example, establishing an equation set with $\sin\theta \cos\phi$, $\sin\theta \sin\phi$ and $\cos\theta$ as unknowns includes: determining a first difference value, a second difference value and a third difference value, according to the difference between phase centers before the first change, the difference between phase centers after the first change, the difference between phase centers after the second change and the difference between phase centers after the third change; and establishing an equation set with $\sin\theta \cos\phi$, $\sin\theta \sin\phi$ and $\cos\theta$ as unknowns, according to the first signals, the second signals, the third signals, the fourth signals, the first difference value, the second difference value and the third difference value.

The first difference value is a difference value between the difference between phase centers after the first change and the difference between phase centers before the first change, the second difference value is a difference value between the difference between phase centers after the second change and the difference between phase centers before the first change, and the third difference value is a difference value between the difference between phase centers after the third change and the difference between phase centers before the first change.

Alternatively, the first difference value is a difference value between the difference between phase centers before the first change and the difference between phase centers after the first change, the second difference value is a difference value between the difference between phase centers after the second change and the difference between phase centers after the first change, and the third difference value is a difference value between the difference between phase centers after the third change and the difference between phase centers after the first change.

Alternatively, the first difference value is a difference value between the difference between phase centers before the first change and the difference between phase centers after the second change, the second difference value is a difference value between the difference between phase centers after the first change and the difference between phase centers after the second change, and the third difference value is a difference value between the difference between phase centers after the third change and the difference between phase centers after the second change.

Alternatively, the first difference value is a difference value between the difference between phase centers before the first change and the difference between phase centers after the third change, the second difference value is a difference value between the difference between phase centers after the first change and the difference between phase centers after the third change, and the third difference value is a difference value between the difference between phase centers after the second change and the difference between phase centers after the third change.

In an example, based on formulas (2) to (5), by taking a measurement result before changing the phase centers as a reference signal, the following equation set can be established:

$$\begin{cases} \arg\{r_1'(k) \cdot r_2'^*(k) \cdot [r_1(k) \cdot r_2^*(k)]^*\} + 2n'\pi = \\ \frac{2\pi}{\lambda}((\Delta x_1' - \Delta x_1) \sin\theta \cos\phi + (\Delta y_1' - \Delta y_1) \sin\theta \sin\phi + (\Delta z_1' - \Delta z_1) \cos\theta); \\ \arg\{r_1''(k) \cdot r_2''^*(k) \cdot [r_1(k) \cdot r_2^*(k)]^*\} + 2n''\pi \\ = \frac{2\pi}{\lambda}((\Delta x_1'' - \Delta x_1) \sin\theta \cos\phi + (\Delta y_1'' - \Delta y_1) \sin\theta \sin\phi + (\Delta z_1'' - \Delta z_1) \cos\theta); \\ \arg\{r_1'''(k) \cdot r_2'''^*(k) \cdot [r_1(k) \cdot r_2^*(k)]^*\} + 2n'''\pi \\ = \frac{2\pi}{\lambda}((\Delta x_1''' - \Delta x_1) \sin\theta \cos\phi + (\Delta y_1''' - \Delta y_1) \sin\theta \sin\phi + (\Delta z_1''' - \Delta z_1) \cos\theta) \end{cases} \text{where}$$

n', n" and n'" are integers.

Of course, a measurement result after the first change between the phase centers can also be used as a reference signal, a measurement result after the second change between the phase centers can be used as a reference signal, or a measurement result after the third change between the phase centers can be used as a reference signal, which is not limited by the embodiments of the present disclosure.

When the change of the difference between the phase centers in the first dimension or the second dimension is less than or equal to the half wavelength of the carrier wave, a unique solution can be obtained in the whole spatial domain, and at this time, n'=n"=0. In most cases, the observable area for signals with effective strength is limited, so the change of the difference between the phase centers in two dimensions can be allowed to be larger than the half wavelength of the carrier wave.

As a special example in this case, if the two analog subarrays are located in the plane of the yoz two-dimensional coordinate system, and if the difference between the phase centers of the two analog subarrays changes by $d_H$ in the azimuth dimension and remains unchanged in the vertical dimension, then $d_H \leq \lambda / |\sin \varphi_{max} - \sin \varphi_{min}|$ needs to be satisfied if the only solution without ambiguity is to be obtained from between azimuths $\varphi_{min}$ and $\varphi_{max}$.

In fact, when it is determined that the received signal is received from the main lobe, the allowed range of $d_H$ is larger. Similarly, if the difference between the phase centers of the two analog subarrays changes by $d_V$ in the vertical dimension and remains unchanged in the azimuth dimension, then $d_V \leq \lambda / |\sin \theta_{max} - \sin \theta_{min}|$ needs to be satisfied if the only solution without ambiguity is to be obtained from between zenith angles $\theta_{min}$ and $\theta_{max}$.

Figure 3A:
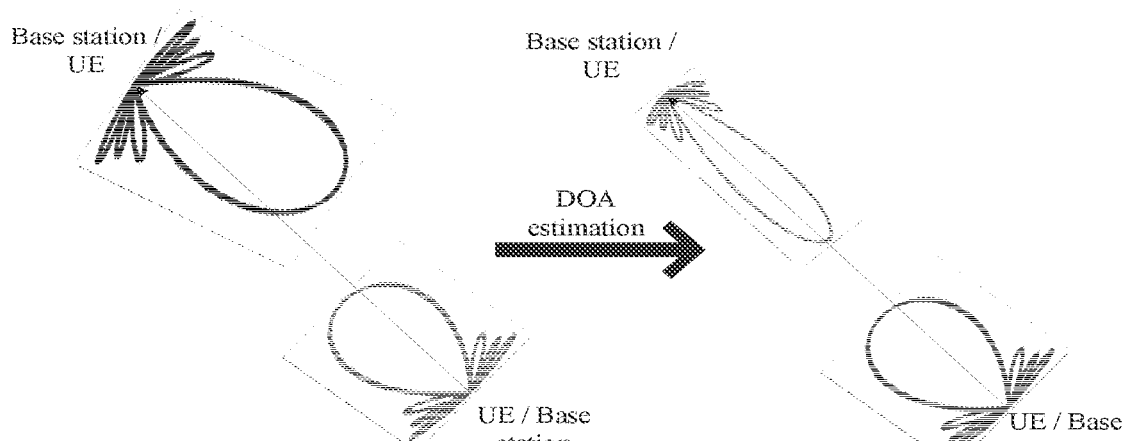
FIG. 3(a) is a schematic diagram of an embodiment of the present disclosure for realizing high-precision beam alignment by estimating DOA.
Figure 3B:
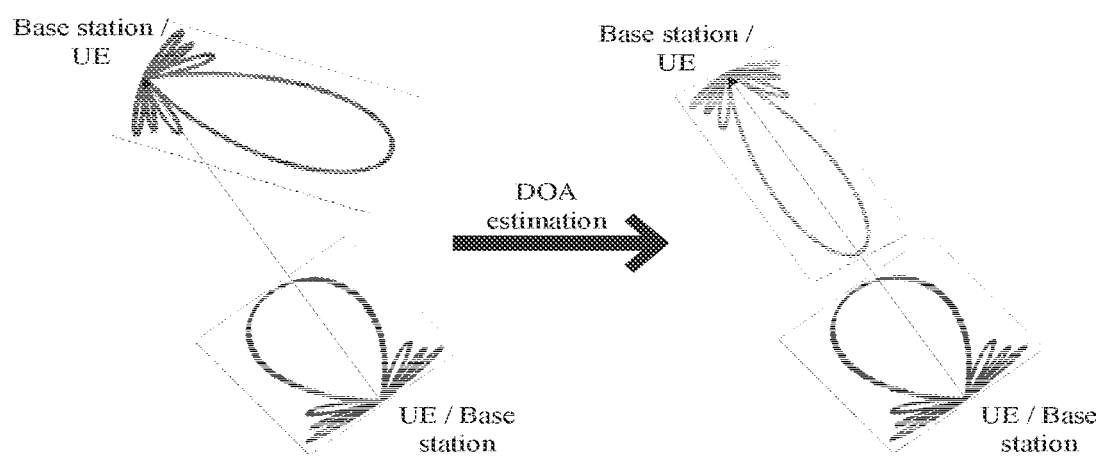
FIG. 3(b) is a schematic diagram of realizing high-precision beam alignment by estimating DOA during sidelobe reception according to an embodiment of the present disclosure.
Figure 4:
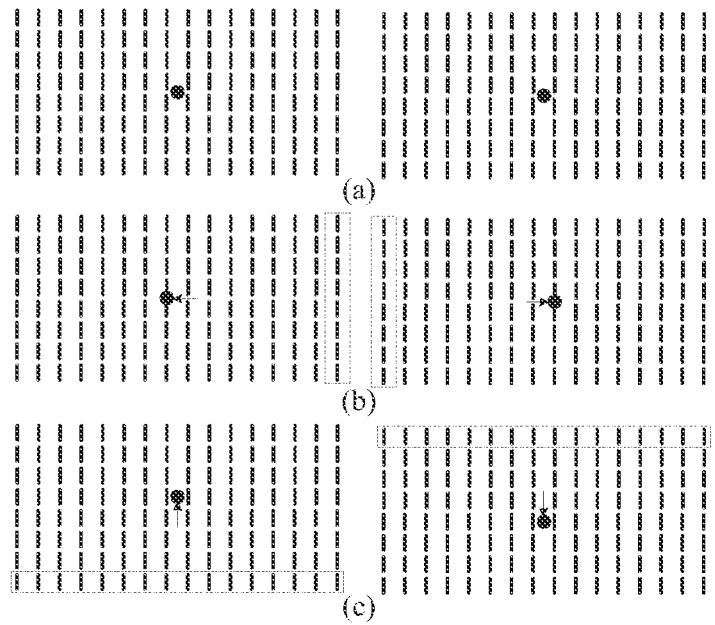
FIG. 4 is a schematic diagram of changing a phase center according to an embodiment of the present disclosure.

According to the embodiments of the present disclosure, the beam alignment is realized based on the change of the difference between the phase centers of two analog subarrays with the same polarization mode, and the beam alignment can be realized only by carrying out three measurements, so that the system overhead and the time for beam alignment are reduced; and the beam alignment is realized by estimating the DOA, the estimated DOA is not limited by the scanning interval, thus the accuracy of beam alignment is improved. As shown in FIG. 3(a), beam alignment can be achieved by adopting the embodiments of the present disclosure even in the case of sidelobe reception (such as non-hot spots), as shown in FIG. 3(b), thereby reducing the number of scanning beams and system overhead in non-hot spots and quickly achieving high-precision beam alignment. Moreover, after the DOA of the received signal is estimated, the scanning of subsequent receiving beams can be stopped, and the transmitting end can be notified to stop transmitting new signals, thereby shortening the scanning time and overhead.

In an embodiment of the present disclosure, either a wide beam or a narrow beam can be used for scanning and receiving. After receiving a signal with effective strength, the subsequent beam scanning can be stopped, but the beam direction can be kept unchanged for measurement and estimation, thus shortening the scanning time and reducing the system overhead.

For example, suppose there are two vertically polarized analog subarrays, each of which is composed of an 8×8 uniform planar array, and the spacing between the radiating elements is half a wavelength of the carrier wave. The beam direction and estimated DOA of each analog subarray are shown in Table 1. It can be seen from Table 1 that even if the DOA of the target signal deviates far from the center of the main lobe of the receiving beam or is located at the side lobe of the receiving beam, the method of the embodiment of the present disclosure can still effectively estimate the DOA of the target signal, thus realizing high-precision beam alignment.

TABLE ONE

| Receiving beam direction $(\theta, \phi)$ | Theoretical value $(\theta, \phi)$ | Estimated value $(\theta, \phi)$ |
|---|---|---|
| (125°, 0°) | (148.39°, 14.04°) | (148.62°, 13.74°) |
| (125°, 0°) | (155.88°, 0°) | (156.52°, −2.57°) |
| (100°, 0°) | (104.45°, −22.62°) | (103.61°, −24.04°) |
| (120°, −20°) | (151.71°, −33.69°) | (151.74°, −34.87°) |
| (110°, −20°) | (136.65°, −18.43°) | (135.35°, −19.10°) |

Referring to FIG. 6, an embodiment of the present disclosure provides a method for realizing beam alignment, which includes the following steps.

At step 600, in response to a reception of first signals with effective signal strengths through a first group of analog subarrays and a second group of analog subarrays by adopting receiving beams having a same beam direction, the first signals received by the first group of analog subarrays, the first signals received by the second group of analog subarrays, a difference between phase centers of two analog subarrays in the first group of analog subarrays, and a difference between phase centers of two analog subarrays in the second group of analog subarrays are acquired; where each of the first and second group of analog subarrays includes two analog subarrays with a same polarization mode.

In an embodiment of the present disclosure, when adopting analog-digital hybrid beamforming, each digital channel is connected with an analog subarray, and each analog subarray is composed of a plurality of analog radiators, and the phases of these radiators can be adjusted by a phase shifter.

In an embodiment of the present disclosure, the first signal with effective strength refers to a first signal with a signal-to-noise ratio greater than or equal to a preset threshold.

In an embodiment of the present disclosure, the polarization modes of different groups of analog subarrays can be the same or different.

In an embodiment of the present disclosure, the two analog subarrays in the first group of analog subarrays and the two analog subarrays in the second group of analog subarrays are different analog subarrays respectively. That is to say, there are four different analog subarrays in total, and every two analog subarrays of these four analog subarrays form a group. In this case, the analog subarrays of different groups can be the same or different.

Alternatively, one of the first group of analog subarrays is the same as one of the second group of analog subarrays. That is to say, there are three different analog subarrays in total, and any two of the three analog subarrays form a group. In this case, it is required that the polarization modes of the three analog subarrays are the same.

In an embodiment of the present disclosure, it is assumed that the spatial angle diagram is as shown in FIG. 2, the target Direction Of Arrival (i.e., DOA) is n̂, a corresponding azimuth is $\phi$, a zenith angle is $\theta$, and a wavelength of the carrier wave is). Assuming that the phase center of the nth analog subarray is $(x_n, y_n, z_n)$, if an origin of coordinates is taken as a reference point, a phase shifting of the phase center under a far-field condition can be expressed by formula (1).

Assuming that the phase centers of the two analog subarrays of the first group of analog subarrays are $(x_1, y_1, z_1)$ and $(x_2, y_2, z_2)$ respectively, and the received first signals are $r_1(k)$ and $r_2(k)$ respectively, then the difference between the phase centers of the two analog subarrays of the first group of analog subarrays is $(\Delta x_1, \Delta y_1, \Delta z_1) = (x_1, y_1, z_1) - (x_2, y_2, z_2)$, and the formula (2) is obtained.

Assuming that the phase centers of the two analog subarrays of the second group of analog subarrays are $(x_3, y_3, z_3)$ and $(x_4, y_4, z_4)$ respectively, and the received first signals are $r_3(k)$ and $r_4(k)$ respectively, then the difference between the phase centers of the two analog subarrays of the second group of analog subarrays is $(\Delta x_2, \Delta y_2, \Delta z_2)=(x_3,y_3,z_3)-(x_4,y_4,z_4)$, and the formula (6) is obtained.

$$\frac{r_3(k) \cdot r_4^*(k)}{|r_3(k) \cdot r_4^*(k)|} = \exp\left[\frac{j2\pi}{\lambda}(\Delta x_2 \sin\theta \cos\phi + \Delta y_2 \sin\theta \sin\phi + \Delta z_2 \cos\theta)\right] \quad (6)$$

At step 601, the beam directions of the receiving beams of the first group of analog subarrays and the second group of analog subarrays are kept unchanged, a first change of the difference between phase centers of the first group of analog subarrays is performed, second signals received by the first group of analog subarrays and a difference between phase centers after the first change of the first group of analog subarrays are acquired, a first change of the difference between phase centers of the second group of analog subarrays is performed, and second signals received by the second group of analog subarrays and a difference between phase centers after the first change of the second group of analog subarrays are acquired.

Assuming that the phase centers of the two analog subarrays of the first group of analog subarrays are $(x_1', y_1', z_1')$ and $(x_2', y_2', z_2')$ respectively after the first change of the difference between phase centers of the two analog subarrays, and the received second signals are $r_1'(k)$ and $r_2'(k)$ respectively, then the difference between the phase centers after the first change of the two analog subarrays of the first group of analog subarrays is $(\Delta x_1', \Delta y_1', \Delta z_1')=(x_1',y_1',z_1')-(x_2,y_2,z_2)$, and the formula (3) is obtained.

Assuming that the phase centers of the two analog subarrays of the second group of analog subarrays are $(x_3', y_3', z_1')$ and $(x_1', y_1', z_4')$ respectively after the first change of the difference between phase centers of the two analog subarrays, and the received second signals are $r_3'(k)$ and $r_4'(k)$ respectively, then the difference between the phase centers after the first change of the two analog subarrays of the second group of analog subarrays is $(\Delta x_2', \Delta y_2', \Delta z_2')=(x_3', y_3', z_3')-(x_4', y_4', z_4')$, and the formula (7) is obtained.

$$\frac{r_3'(k) \cdot r_4'^*(k)}{|r_3'(k) \cdot r_4'^*(k)|} = \exp\left[\frac{j2\pi}{\lambda}(\Delta x_2' \sin\theta \cos\phi + \Delta y_2' \sin\theta \sin\phi + \Delta z_2' \cos\theta)\right] \quad (7)$$

In an embodiment of the present disclosure, when performing the first change of a difference between phase centers of the first and second group of analog subarrays respectively,
  the first change on a first dimension of the first group of analog subarrays is performed; and the first change on a second dimension of the second group of analog subarrays is performed;
  alternatively, the first change on a second dimension of the first group of analog subarrays is performed; and the first change on a first dimension of the second group of analog subarrays is performed;
  alternatively, the first change on a first and second dimensions of the first group of analog subarrays is performed; and the first change on one or both of the first and second dimensions of the second group of analog subarrays is performed;
  alternatively, the first change on one or both of a first and second dimensions of the first group of analog subarrays is performed; and the first change on the first and second dimensions of the second group of analog subarrays is performed.

The first dimension may be an azimuth dimension and the second dimension may be a vertical dimension. Alternatively, the first dimension may be a vertical dimension and the second dimension may be an azimuth dimension. The first dimension and the second dimension may also be other dimensions, which are not limited by the embodiments of the present disclosure.

In an embodiment of the present disclosure, for each group of analog subarrays, the difference between the phase centers of the two analog subarrays can be changed by changing the phase centers of both of the two analog subarrays, or by changing the phase center of one of the two analog subarrays.

In an embodiment of the present disclosure, the phase center can be changed in any of the following modes.

In the first mode, some radiators in a analog subarray are directly turned off, which will cause the phase center of the analog subarray to shift. In an implementation, for each group of analog subarrays, a difference between phase centers of the two analog subarrays is changed by turning off part of radiators of one of the analog subarrays or part of radiators of the two analog subarrays.

For example, as shown in FIG. 5, the filled circle in FIG. 5 represents the equivalent phase center of each analog subarray. FIG. 5(a) shows the schematic diagram of the phase center before changing, FIG. 5(b) shows the schematic diagram of changing the phase center in an azimuth dimension, and FIG. 5(c) shows the schematic diagram of changing the phase center in a vertical dimension.

In FIG. 5(b), the last column of radiators of the first analog subarray and the first column of radiators of the second analog subarray are turned off, thus causing the difference between phase centers to change in the azimuth dimension. In FIG. 5(c), the last row of radiators of the first analog subarray and the first row of radiators of the second analog subarray are turned off, thus causing the difference between phase centers to change in the vertical dimension.

In the second mode, an equivalent signal processing can be adopted for radiators that cannot be properly turned off (such as analog radiators only subjected to constant modulus phase modulation), so that the radiators that need to be turned off can form a beam nulling or a low sidelobe in the observable area. As shown in FIG. 6, some radiators of the analog subarray form an effective receiving beam pointing to the observable area, while the other radiators form a blocking beam pointing to the non-observable area, so that the radiators forming the blocking beam are equivalent to being turned off, thus causing the change of the equivalent phase center of the analog subarray. That is, for each group of analog subarrays, a difference between phase centers of the two analog subarrays is changed, by forming a blocking beam pointed to a non-observable area or forming a beam nulling or a low sidelobe at an observable area, through radiators which need to be turned off in one or both of the two analog subarrays.

At step 602, a Direction Of Arrival (DOA) of a receiving signal is estimated, and a center of a receiving beam is directed to the estimated DOA, according to the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays.

In an embodiment of the present disclosure, the estimation of DOA can be performed by any of the following modes.

In a first method, a second objective function is determined, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays; all desirable DOAs are traversed to obtain a value of the second objective function corresponding to each of the desirable DOAs, and a DOA with a smallest value of the second objective function is taken as the estimated DOA.

In an illustrative example, based on formulas (2), (3), (6) and (7), the second objective function can be determined as:

$$\left| \frac{r_1(k) \cdot r_2^*(k)}{|r_1(k) \cdot r_2^*(k)|} - \exp\left[\frac{j2\pi}{\lambda}(\Delta x_1 \sin\theta \cos\phi + \Delta y_1 \sin\theta \sin\phi + \Delta z_1 \cos\theta)\right] \right| +$$

$$\left| \frac{r_1'(k) \cdot r_2'^*(k)}{|r_1'(k) \cdot r_2'^*(k)|} - \exp\left[\frac{j2\pi}{\lambda}(\Delta x_1' \sin\theta \cos\phi + \Delta y_1' \sin\theta \sin\phi + \Delta z_1' \cos\theta)\right] \right| +$$

$$\left| \frac{r_3(k) \cdot r_4^*(k)}{|r_3(k) \cdot r_4^*(k)|} - \exp\left[\frac{j2\pi}{\lambda}(\Delta x_2 \sin\theta \cos\phi + \Delta y_2 \sin\theta \sin\phi + \Delta z_2 \cos\theta)\right] \right| +$$

$$\left| \frac{r_3'(k) \cdot r_4'^*(k)}{|r_3'(k) \cdot r_4'^*(k)|} - \exp\left[\frac{j2\pi}{\lambda}(\Delta x_2' \sin\theta \cos\phi + \Delta y_2' \sin\theta \sin\phi + \Delta z_2' \cos\theta)\right] \right| +$$

or, $$\left( \frac{r_1(k) \cdot r_2^*(k)}{|r_1(k) \cdot r_2^*(k)|} - \exp\left[\frac{j2\pi}{\lambda}(\Delta x_1 \sin\theta \cos\phi + \Delta y_1 \sin\theta \sin\phi + \Delta z_1 \cos\theta)\right] \right)^2 +$$

$$\left( \frac{r_1'(k) \cdot r_2'^*(k)}{|r_1'(k) \cdot r_2'^*(k)|} - \exp\left[\frac{j2\pi}{\lambda}(\Delta x_1' \sin\theta \cos\phi + \Delta y_1' \sin\theta \sin\phi + \Delta z_1' \cos\theta)\right] \right)^2 +$$

$$\left( \frac{r_3(k) \cdot r_4^*(k)}{|r_3(k) \cdot r_4^*(k)|} - \exp\left[\frac{j2\pi}{\lambda}(\Delta x_2 \sin\theta \cos\phi + \Delta y_2 \sin\theta \sin\phi + \Delta z_2 \cos\theta)\right] \right)^2 +$$

$$\left( \frac{r_3'(k) \cdot r_4'^*(k)}{|r_3'(k) \cdot r_4'^*(k)|} - \exp\left[\frac{j2\pi}{\lambda}(\Delta x_2' \sin\theta \cos\phi + \Delta y_2' \sin\theta \sin\phi + \Delta z_2' \cos\theta)\right] \right)^2 +$$

In a second method, an equation set with $\theta$ and $\phi$ as unknowns is established, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays; where $\theta$ is a zenith angle of the DOA, $\phi$ is an azimuth of the DOA; and the equation set is solved to obtain $\theta$ and $\phi$.

In an example, establishing an equation set with $\theta$ and $\phi$ as unknowns includes: determining a fourth difference value and a fifth difference value, according to the difference between phase centers before change and the difference between phase centers after change of the first group of analog subarrays, and the difference between phase centers before change and the difference between phase centers after change of the second group of analog subarrays, respectively; and establishing an equation set with $\theta$ and $\phi$ as unknowns, according to the first signals and the second signals received by the first group of analog subarrays, the first signals and the second signals received by the second group of analog subarrays, the fourth difference value and the fifth difference value.

The fourth difference value is a difference value between the difference between phase centers after the first change and the difference between phase centers before the first change, of the first group of analog subarrays, and the fifth difference value is a difference value between the difference between phase centers after the first change and the difference between phase centers before the first change, of the second group of analog subarrays.

Alternatively, the fourth difference value is a difference value between the difference between phase centers after the first change and the difference between phase centers before the first change, of the second group of analog subarrays, and the fifth difference value is a difference value between the difference between phase centers after the first change and the difference between phase centers before the first change, of the first group of analog subarrays.

Alternatively, the fourth difference value is a difference value between the difference between phase centers before the first change and the difference between phase centers after the first change, of the first group of analog subarrays, and the fifth difference value is a difference value between the difference between phase centers before the first change and the difference between phase centers after the first change, of the second group of analog subarrays.

Alternatively, the fourth difference value is a difference value between the difference between phase centers before the first change and the difference between phase centers after the first change, of the second group of analog subarrays, and the fifth difference value is a difference value between the difference between phase centers before the first change and the difference between phase centers after the first change, of the first group of analog subarrays.

In an example, based on formulas (2), (3), (6) and (7), by taking a measurement result before changing the phase centers as a reference signal, the following equation set can be established:

$$\begin{cases} \arg\{r'_1(k) \cdot r'^*_2(k) \cdot [r_1(k) \cdot r^*_2(k)]^*\} + 2n'\pi = \\ \quad \frac{2\pi}{\lambda}((\Delta x'_1 - \Delta x_1) \sin\theta \cos\phi + (\Delta y'_1 - \Delta y_1) \sin\theta \sin\phi + (\Delta z'_1 - \Delta z_1) \cos\theta); \\ \arg\{r'_3(k) \cdot r'^*_4(k) \cdot [r_3(k) \cdot r^*_4(k)]^*\} + 2n''\pi \\ \quad = \frac{2\pi}{\lambda}((\Delta x'_2 - \Delta x_2) \sin\theta \cos\phi + (\Delta y'_2 - \Delta y_2) \sin\theta \sin\phi + (\Delta z'_2 - \Delta z_2) \cos\theta) \end{cases} ;\text{where } n'$$

and n" are integers.

Of course, a measurement result after the first change between the phase centers can also be used as a reference signal, or a measurement result after the second change between the phase centers can be used as a reference signal, which is not limited by the embodiments of the present disclosure.

In the second method, the process of solving equation sets directly is obviously complicated. In order to simplify the process of solving equation sets, the difference between the phase centers of two analog subarrays can be changed according to certain rules.

For example, when the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays are values in a global coordinate system, the difference can be changed according to the following rules:

the coordinates on the first and second dimensions of the fourth difference value in the global coordinate system are 0, and the coordinate on the third dimension of the fifth difference value in the global coordinate system is 0;

alternatively, the coordinates on the first and second dimensions of the fifth difference value in the global coordinate system are 0, and the coordinate on the third dimension of the fourth difference value in the global coordinate system is 0.

The fourth difference value is a difference value between the difference between phase centers after the first change and the difference between phase centers before the first change, of the first group of analog subarrays, and the fifth difference value is a difference value between the difference between phase centers after the first change and the difference between phase centers before the first change, of the second group of analog subarrays.

Alternatively, the fourth difference value is a difference value between the difference between phase centers before the first change and the difference between phase centers after the first change, of the first group of analog subarrays, and the fifth difference value is a difference value between the difference between phase centers before the first change and the difference between phase centers after the first change, of the second group of analog subarrays.

Globe Coordinate System (GCS) refers to a coordinate system defined in a standard, which is a three-dimensional coordinate system.

For example, after changing the difference between the phase centers of two groups of analog subarrays according to such rules, the equation set established above can be simplified as:

$$(\Delta y_1' - \Delta y_1) \sin \theta \sin \phi = a$$

$$(\Delta x_2' - \Delta x_2) \sin \theta \cos \phi + (\Delta z_2' - \Delta z_2) \cos \theta = b$$

For another example, when the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays are values in a local coordinate system, the difference can be changed according to the following rules:

the coordinate on the first dimension of the fourth difference value in the local coordinate system is 0, and the coordinate on the second dimension of the fifth difference value in the local coordinate system is 0;

alternatively, the coordinate on the first dimension of the fifth difference value in the local coordinate system is 0, and the coordinate on the second dimension of the fourth difference value in the local coordinate system is 0.

The Local Coordinate System (LCS) is a two-dimensional coordinate system. In this case, the antenna array (that is, the analog subarray) needs to be located in the plane of the coordinate system to realize the above calculation.

For example, after changing the difference between the phase centers of two analog subarrays according to such rules, the equation set established above can be simplified as:

$$(\Delta y_1' - \Delta y_1) \sin\theta \sin\phi = a$$

$$(\Delta z_2' - \Delta z_2) \cos\theta = b$$

In another embodiment of the present disclosure, before estimating a DOA of a receiving signal, the method further includes:

keeping the beam directions of the receiving beams of the first group of analog subarrays and the second group of analog subarrays unchanged, performing a second change of the difference between phase centers of the first group of analog subarrays, acquiring third signals received by the first group of analog subarrays and a difference between phase centers after the second change of the first group of analog subarrays;

alternatively, keeping the beam directions of the receiving beams of the first group of analog subarrays and the second group of analog subarrays unchanged, performing a second change of the difference between phase centers of the second group of analog subarrays, acquiring third signals received by the second group of analog subarrays and a difference between phase centers after the second change of the second group of analog subarrays.

Estimating a DOA of a receiving signal includes:

estimating a DOA of a receiving signal, according to the first signals, the second signals and the third signals received by the first group of analog subarrays, the difference between phase centers before the first change, the difference between phase centers after the first change and the difference between phase centers after the second change of the first group of analog subarrays, the first signals and the second signals received by the second group of analog subarrays, the difference between phase centers before the first change and the difference between phase centers after the first change of the second group of analog subarrays;

alternatively, estimating a DOA of a receiving signal, according to the first signals and the second signals received by the first group of analog subarrays, the difference between phase centers before the first change and the difference between phase centers after the first change of the first group of analog subarrays, the first signals, the second signals and the third signals received by the second group of analog subarrays, the difference between phase centers before the first change, the difference between phase centers after the first change and the difference between phase centers after the second change of the second group of analog subarrays.

Assuming that the phase centers of the two analog subarrays of the first group of analog subarrays are $(x_1'', y_1'', z_1'')$ and $(x_2'', y_2'', z_2'')$ respectively after the second change of the difference between phase centers of the two analog subarrays of the first group of analog subarrays, and the received third signals are $r_1''(k)$ and $r_2''(k)$ respectively, then the difference between the phase centers after the second change of the two analog subarrays of the first group of analog subarrays is $(\Delta x_1'', \Delta y_1'', \Delta z_1'') = (x_1'', y_1'', z_1'') - (x_2'', y_2'', z_2'')$, and the formula (4) is obtained.

Assuming that the phase centers of the two analog subarrays of the second group of analog subarrays are $(x_3'', y_3'', z_3'')$ and $(x_4'', y_4'', z_4'')$ respectively after the second change of the difference between phase centers of the two analog subarrays of the second group of analog subarrays, and the received third signals are $r_3''(k)$ and $r_4''(k)$ respectively, then the difference between the phase centers after the second change of the two analog subarrays of the second group of analog subarrays is $(\Delta x_2'', \Delta y_2'', \Delta z_2'') = (x_3'', y_3'', z_3'') - (x_4'', y_4'', z_4'')$, and the formula (8) is obtained.

$$\frac{r_3''(k) \cdot r_4''^*(k)}{|r_3''(k) \cdot r_4''^*(k)|} = \exp\left[\frac{j2\pi}{\lambda}(\Delta x_2'' \sin\theta \cos\phi + \Delta y_2'' \sin\theta \sin\phi + \Delta z_2'' \cos\theta)\right] \quad (8)$$

It should be noted that the difference between the phase centers of the two groups of analog subarrays after the first change is different from the difference between the phase centers after the second change.

In an embodiment of the present disclosure, the first signals, the second signals and the third signals can be received at different time units. That is, step 600 and step 601 are executed in different time units, respectively. The time unit may be a symbol or a time slot.

In an example, estimating a DOA of a receiving signal includes:
establishing an equation set with $\sin \theta \cos \phi$, $\sin \theta \sin \phi$ and $\cos \theta$ as unknowns, according to the first signals, the second signals and the third signals received by the first group of analog subarrays, the difference between phase centers before the first change, the difference between phase centers after the first change and the difference between phase centers after the second change of the first group of analog subarrays, the first signals and the second signals received by the second group of analog subarrays, the difference between phase centers before the first change and the difference between phase centers after the first change of the second group of analog subarrays, where $\theta$ is a zenith angle of the DOA, $\phi$ is an azimuth of the DOA; obtaining $\sin \theta \cos \phi$, $\sin \theta \sin \phi$ and $\cos \theta$ by solving the equation set; and calculating $\theta$ and $\phi$ according to $\sin \theta \cos \phi$, $\sin \theta \sin \phi$ and $\cos \theta$;
alternatively, establishing an equation set with $\sin \theta \cos \phi$, $\sin \theta \sin \phi$ and $\cos \theta$ as unknowns, according to the first signals and the second signals received by the first group of analog subarrays, the difference between phase centers before the first change and the difference between phase centers after the first change of the first group of analog subarrays, the first signals, the second signals and the third signals received by the second group of analog subarrays, the difference between phase centers before the first change, the difference between phase centers after the first change and the difference between phase centers after the second change of the second group of analog subarrays; obtaining $\sin \theta \cos \phi$, $\sin \theta \sin \phi$ and $\cos \theta$ by solving the equation set; and calculating $\theta$ and $\phi$ according to $\sin \theta \cos \phi$, $\sin \theta \sin \phi$ and $\cos \theta$.

In an example, establishing an equation set with $\sin \theta \cos \phi$, $\sin \theta \sin \phi$ and $\cos \theta$ as unknowns includes: determining a fourth difference value, a fifth difference value and a sixth difference value, according to the difference between phase centers before the first change, the difference between phase centers after the first change and the difference between phase centers after the second change of the first group of analog subarrays, and the difference between phase centers before the first change and the difference between phase centers after the first change of the second group of analog subarrays, respectively; and establishing an equation set with $\sin \theta \cos \phi$, $\sin \theta \sin \phi$ and $\cos \theta$ as unknowns, according to the first signals, the second signals and the third signals received by the first group of analog subarrays, the first signals and the second signals received by the second group of analog subarrays, the fourth difference value, the fifth difference value and the sixth difference value.

The fourth difference value is a difference value between the difference between phase centers after the first change and the difference between phase centers before the first change, of the first group of analog subarrays, the fifth difference value is a difference value between the difference between phase centers after the first change and the difference between phase centers before the first change, of the second group of analog subarrays, and the sixth difference value is a difference value between the difference between phase centers after the second change and the difference between phase centers before the first change, of the first group of analog subarrays.

Alternatively, the fourth difference value is a difference value between the difference between phase centers before the first change and the difference between phase centers after the first change, of the first group of analog subarrays, the fifth difference value is a difference value between the difference between phase centers before the first change and the difference between phase centers after the first change, of the second group of analog subarrays, and the sixth difference value is a difference value between the difference between phase centers after the second change and the difference between phase centers after the first change, of the first group of analog subarrays.

Alternatively, the fourth difference value is a difference value between the difference between phase centers before the first change and the difference between phase centers after the second change, of the first group of analog subarrays, the fifth difference value is a difference value between the difference between phase centers before the first change and the difference between phase centers after the first change, of the second group of analog subarrays, and the sixth difference value is a difference value between the difference between phase centers after the first change and the difference between phase centers after the second change, of the first group of analog subarrays.

In an example, establishing an equation set with $\sin \theta \cos \phi$, $\sin \theta \sin \phi$ and $\cos \theta$ as unknowns includes: determining a fourth difference value, a fifth difference value and a seventh difference value, according to the difference between phase centers before the first change and the difference between phase centers after the first change of the first group of analog subarrays, and the difference between phase centers before the first change, the difference between phase centers after the first change and the difference between phase centers after the second change of the second group of analog subarrays, respectively; and establishing an equation set with $\sin \theta \cos \phi$, $\sin \theta \sin \phi$ and $\cos \theta$, as unknowns, according to the first signals, the second signals and the third signals received by the first group of analog subarrays, the first signals and the second signals received by the second group of analog subarrays, the fourth difference value, the fifth difference value and the seventh difference value.

The fourth difference value is a difference value between the difference between phase centers after the first change and the difference between phase centers before the first change, of the first group of analog subarrays, the fifth difference value is a difference value between the difference between phase centers after the first change and the difference between phase centers before the first change, of the second group of analog subarrays, and the seventh difference value is a difference value between the difference between phase centers after the second change and the difference between phase centers before the first change, of the second group of analog subarrays.

Alternatively, the fourth difference value is a difference value between the difference between phase centers before the first change and the difference between phase centers after the first change, of the first group of analog subarrays, the fifth difference value is a difference value between the difference between phase centers before the first change and the difference between phase centers after the first change, of the second group of analog subarrays, and the seventh difference value is a difference value between the difference between phase centers after the second change and the difference between phase centers after the first change, of the second group of analog subarrays.

Alternatively, the fourth difference value is a difference value between the difference between phase centers before the first change and the difference between phase centers after the second change, of the first group of analog subarrays, the fifth difference value is a difference value between the difference between phase centers before the first change and the difference between phase centers after the first change, of the second group of analog subarrays, and the seventh difference value is a difference value between the difference between phase centers after the first change and the difference between phase centers after the second change, of the second group of analog subarrays.

In an example, based on formulas (2), (3), (4), (6), (7) and (8), by taking a measurement result before changing the phase centers as a reference signal, the following equation set can be established:

$$\begin{cases} \arg\{r'_1(k) \cdot r'^*_2(k) \cdot [r_1(k) \cdot r^*_2(k)]^*\} + 2n'\pi = \\ \frac{2\pi}{\lambda}((\Delta x'_1 - \Delta x_1) \sin\theta \cos\phi + (\Delta y'_1 - \Delta y_1) \sin\theta \sin\phi + (\Delta z'_1 - \Delta z_1) \cos\theta); \\ \arg\{r''_1(k) \cdot r''^*_2(k) \cdot [r_1(k) \cdot r^*_2(k)]^*\} + 2n''\pi \\ = \frac{2\pi}{\lambda}((\Delta x''_1 - \Delta x_1) \sin\theta \cos\phi + (\Delta y''_1 - \Delta y_1) \sin\theta \sin\phi + (\Delta z''_1 - \Delta z_1) \cos\theta); \\ \arg\{r'_3(k) \cdot r'^*_4(k) \cdot [r_3(k) \cdot r^*_4(k)]^*\} + 2n'''\pi \\ = \frac{2\pi}{\lambda}((\Delta x'_2 - \Delta x_2) \sin\theta \cos\phi + (\Delta y'_2 - \Delta y_2) \sin\theta \sin\phi + (\Delta z'_2 - \Delta z_2) \cos\theta) \end{cases}$$

or, $$\begin{cases} \arg\{r'_1(k) \cdot r'^*_2(k) \cdot [r_1(k) \cdot r^*_2(k)]^*\} + 2n'\pi = \\ \frac{2\pi}{\lambda}((\Delta x'_1 - \Delta x_1) \sin\theta \cos\phi + (\Delta y'_1 - \Delta y_1) \sin\theta \sin\phi + (\Delta z'_1 - \Delta z_1) \cos\theta); \\ \arg\{r''_3(k) \cdot r''^*_4(k) \cdot [r_3(k) \cdot r^*_4(k)]^*\} + 2n''\pi \\ = \frac{2\pi}{\lambda}((\Delta x''_2 - \Delta x_2) \sin\theta \cos\phi + (\Delta y''_2 - \Delta y_2) \sin\theta \sin\phi + (\Delta z''_2 - \Delta z_2) \cos\theta); \\ \arg\{r'_3(k) \cdot r'^*_4(k) \cdot [r_3(k) \cdot r^*_4(k)]^*\} + 2n'''\pi \\ = \frac{2\pi}{\lambda}((\Delta x'_2 - \Delta x_2) \sin\theta \cos\phi + (\Delta y'_2 - \Delta y_2) \sin\theta \sin\phi + (\Delta z'_2 - \Delta z_2) \cos\theta) \end{cases}$$

Of course, a measurement result after the first change between the phase centers can also be used as a reference signal, a measurement result after the second change between the phase centers can be used as a reference signal, or a measurement result after the third change between the phase centers can be used as a reference signal, which is not limited by the embodiments of the present disclosure.

When the change of the difference between the phase centers in the first dimension or the second dimension is less than or equal to the half wavelength of the carrier wave, a unique solution can be obtained in the whole spatial domain, and at this time, n'=n''=n'''=0. In most cases, the observable area for signals with effective strength is limited, so the change of the difference between the phase centers in two dimensions can be allowed to be larger than the half wavelength of the carrier wave.

As a special example in this case, if the two analog subarrays are located in the plane of the yoz two-dimensional coordinate system, and if the difference between the phase centers of the two analog subarrays changes by $d_H$ in the azimuth dimension and remains unchanged in the vertical dimension, then $d_H \leq \lambda/|\sin\varphi_{max} - \sin\varphi_{min}|$ needs to be satisfied if the only solution without ambiguity is to be obtained from between azimuths $\varphi_{min}$ and $\varphi_{max}$.

In fact, when it is determined that the received signal is received from the main lobe, the allowed range of $d_H$ is larger. Similarly, if the difference between the phase centers of the two analog subarrays changes by $d_V$ in the vertical dimension and remains unchanged in the azimuth dimension, then $d_V \leq \lambda/|\sin\theta_{max} - \sin\theta_{min}|$ needs to be satisfied if the only solution without ambiguity is to be obtained from between zenith angles $\theta_{min}$ and $\theta_{max}$.

According to the embodiments of the present disclosure, the beam alignment is realized based on the change of the difference between the phase centers of two groups of analog subarrays, and the beam alignment can be realized only by carrying out at least two measurements, so that the system overhead and the time for beam alignment are reduced; and the beam alignment is realized by estimating the DOA, the estimated DOA is not limited by the scanning interval, thus the accuracy of beam alignment is improved. As shown in FIG. 3(a), beam alignment can be achieved by adopting the embodiments of the present disclosure even in the case of sidelobe reception (such as non-hot spots), as shown in FIG. 3(b), thereby reducing the number of scanning beams and system overhead in non-hot spots and quickly achieving high-precision beam alignment. Moreover, after the DOA of the received signal is estimated, the scanning of subsequent receiving beams can be stopped, and the transmitting end can be notified to stop transmitting new signals, thereby shortening the scanning time and overhead.

In an embodiment of the present disclosure, either a wide beam or a narrow beam can be used for scanning and receiving. After receiving a signal with effective strength, the subsequent beam scanning can be stopped, but the beam direction can be kept unchanged for measurement and estimation, thus shortening the scanning time and reducing the system overhead.

Figure 7:
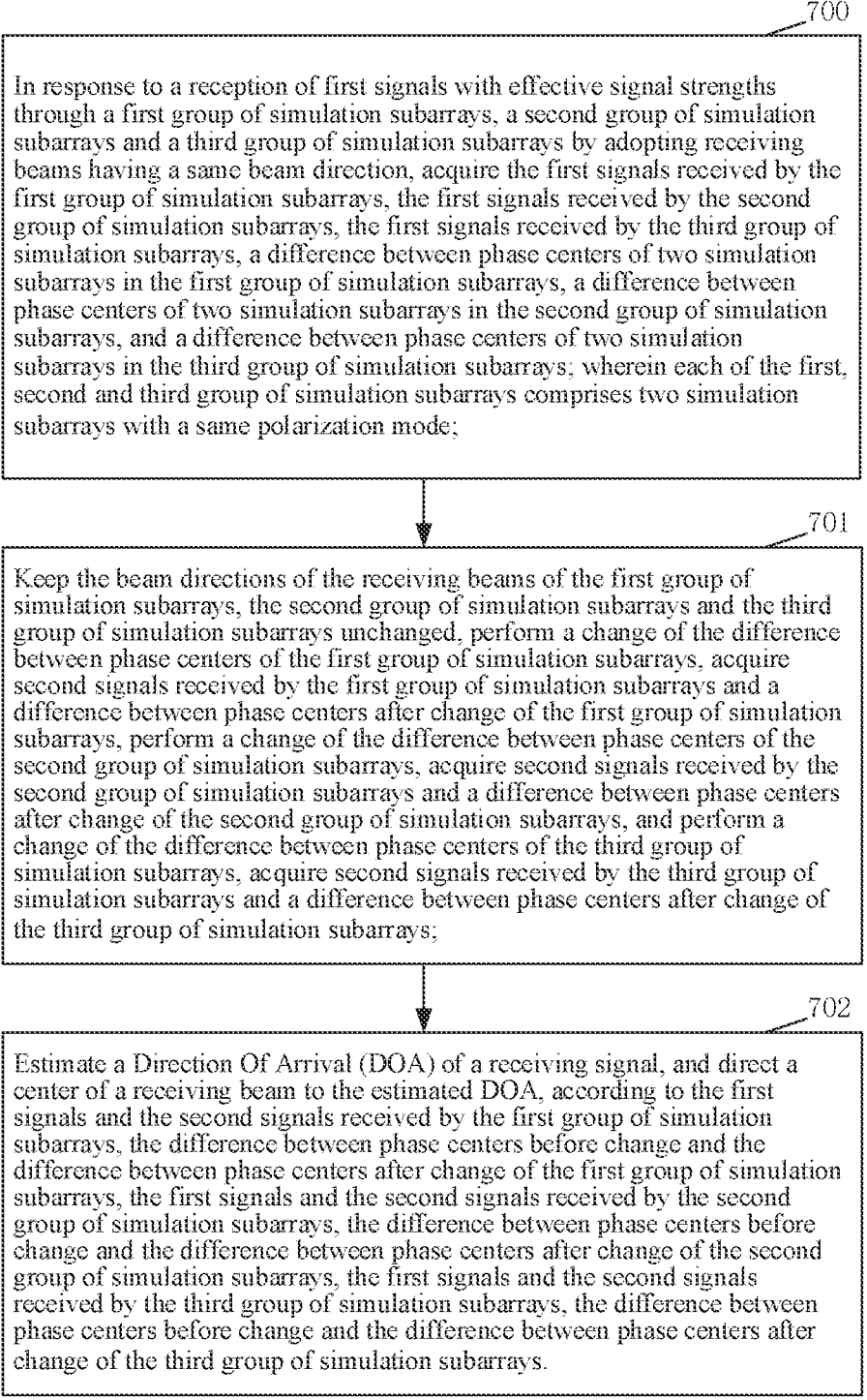
FIG. 7 is a flowchart of a method for realizing beam alignment according to another embodiment of the present disclosure.

Referring to FIG. 7, another embodiment of the present disclosure provides a method for realizing beam alignment, which includes the following steps.

At step 707, in response to a reception of first signals with effective signal strengths through a first group of analog subarrays, a second group of analog subarrays and a third group of analog subarrays by adopting receiving beams having a same beam direction, the first signals received by the first group of analog subarrays, the first signals received by the second group of analog subarrays, the first signals received by the third group of analog subarrays, a difference between phase centers of two analog subarrays in the first group of analog subarrays, a difference between phase centers of two analog subarrays in the second group of analog subarrays, and a difference between phase centers of two analog subarrays in the third group of analog subarrays are acquired; where each of the first, second and third group of analog subarrays includes two analog subarrays with a same polarization mode.

In an embodiment of the present disclosure, when adopting analog-digital hybrid beamforming, each digital channel is connected with an analog subarray, and each analog subarray is composed of a plurality of analog radiators, and the phases of these radiators can be adjusted by a phase shifter.

In an embodiment of the present disclosure, the first signal with effective strength refers to a first signal with a signal-to-noise ratio greater than or equal to a preset threshold.

In an embodiment of the present disclosure, the polarization modes of different groups of analog subarrays can be the same or different.

In an embodiment of the present disclosure, the two analog subarrays in the first group of analog subarrays, the two analog subarrays in the second group of analog subarrays and the two analog subarrays in the third group of analog subarrays are different analog subarrays respectively. That is to say, there are six different analog subarrays in total, and every two analog subarrays of these six analog subarrays form a group. In this case, the analog subarrays of different groups can be the same or different.

Alternatively, one of any two or three groups of analog subarrays in the first, second and third groups of analog subarrays is identical to another one of the other of the any two or three groups of analog subarrays. That is to say, there are four different analog subarrays in total, and any two of the four analog subarrays form a group, it is required that the polarization modes of the four analog subarrays are the same; or, there are five different analog subarrays in total, and any two of the five analog subarrays form a group.

In an embodiment of the present disclosure, it is assumed that the spatial angle diagram is as shown in FIG. 2, the target Direction Of Arrival (i.e., DOA) is n̂, a corresponding azimuth is $\phi$, a zenith angle is $\theta$, and a wavelength of the carrier wave is $\lambda$. Assuming that the phase center of the nth analog subarray is $(x_n, y_n, z_n)$, if an origin of coordinates is taken as a reference point, a phase shifting of the phase center under a far-field condition can be expressed by formula (1).

Assuming that the phase centers of the two analog subarrays of the first group of analog subarrays are $(x_1, y_1, z_1)$ and $(x_2, y_2, z_2)$ respectively, and the received first signals are $r_1(k)$ and $r_2(k)$ respectively, then the difference between the phase centers of the two analog subarrays of the first group of analog subarrays is $(\Delta x_1, \Delta y_1, \Delta z_1)=(x_1,y_1,z_1)-(x_2,y_2,z_2)$, and the formula (2) is obtained.

Assuming that the phase centers of the two analog subarrays of the second group of analog subarrays are $(x_3, y_3, z_3)$ and $(x_4, y_4, z_4)$ respectively, and the received first signals are $r_3(k)$ and $r_4(k)$ respectively, then the difference between the phase centers of the two analog subarrays of the second group of analog subarrays is $(\Delta x_2, \Delta y_2, \Delta z_2)=(x_3,y_3,z_3)-(x_4,y_4,z_4)$, and the formula (6) is obtained.

Assuming that the phase centers of the two analog subarrays of the third group of analog subarrays are $(x_5, y_5, z_5)$ and $(x_6, y_6, z_6)$ respectively, and the received first signals are $r_5(k)$ and $r_6(k)$ respectively, then the difference between the phase centers of the two analog subarrays of the third group of analog subarrays is $(\Delta x_3, \Delta y_3, \Delta z_3)=(x_5,y_5,z_5)-(x_6,y_6,z_6)$, and the formula (9) is obtained.

$$\frac{r_5(k) \cdot r_6^*(k)}{|r_5(k) \cdot r_6^*(k)|} = \exp\left[\frac{j2\pi}{\lambda}(\Delta x_3 \sin\theta \cos\phi + \Delta y_3 \sin\theta \sin\phi + \Delta z_3 \cos\theta)\right] \quad (9)$$

At step 701, the beam directions of the receiving beams of the first group of analog subarrays, the second group of analog subarrays and the third group of analog subarrays are kept unchanged, a change of the difference between phase centers of the first group of analog subarrays is performed, second signals received by the first group of analog subarrays and a difference between phase centers after change of the first group of analog subarrays are acquired, a change of the difference between phase centers of the second group of analog subarrays is performed, second signals received by the second group of analog subarrays and a difference between phase centers after change of the second group of analog subarrays are acquired, and a change of the difference between phase centers of the third group of analog subarrays is performed, second signals received by the third group of analog subarrays and a difference between phase centers after change of the third group of analog subarrays are acquired.

In an embodiment of the present disclosure, the first signals and the second signals can be received at different time units. That is, step 700 and step 701 are executed in different time units, respectively. The time unit may be a symbol or a time slot.

Assuming that the phase centers of the two analog subarrays of the first group of analog subarrays are $(x_1', y_1', z_1')$ and $(x_2', y_2', z_2')$ respectively after the change of the difference between phase centers of the two analog subarrays, and the received second signals are $r_1'(k)$ and $r_2'(k)$ respectively, then the difference between the phase centers after the change of the two analog subarrays of the first group of analog subarrays is $(\Delta x_1', \Delta y_1', \Delta z_1') = (x_1', y_1', z_1') - (x_2', y_2', z_2')$, and the formula (3) is obtained.

Assuming that the phase centers of the two analog subarrays of the second group of analog subarrays are $(x_3', y_3', z_3')$ and $(x_4', y_4', z_4')$ respectively after the change of the difference between phase centers of the two analog subarrays, and the received second signals are $r_3'(k)$ and $r_4'(k)$ respectively, then the difference between the phase centers after the change of the two analog subarrays of the second group of analog subarrays is $(\Delta x_2', \Delta y_2', \Delta z_2') = (x_3', y_3', z_3') - (x_4', y_4', \Delta z_4')$, and the formula (7) is obtained.

Assuming that the phase centers of the two analog subarrays of the third group of analog subarrays are $(x_5', y_5', z_5')$ and $(x_6', y_6', z_6')$ respectively after the change of the difference between phase centers of the two analog subarrays, and the received second signals are $r_5'(k)$ and $r_6'(k)$ respectively, then the difference between the phase centers after the change of the two analog subarrays of the third group of analog subarrays is $(\Delta x_3', \Delta y_3', \Delta z_3') = (x_5', y_5', z_5') - (x_6', y_6', z_6')$, and the formula (10) is obtained.

$$\frac{r_5'(k) \cdot r_6'^*(k)}{|r_5'(k) \cdot r_6'^*(k)|} = \exp\left[\frac{j2\pi}{\lambda}(\Delta x_3' \sin\theta \cos\phi + \Delta y_3' \sin\theta \sin\phi + \Delta z_3' \cos\theta)\right] \quad (10)$$

In an embodiment of the present disclosure, when performing the change of a difference between phase centers of the first, second and third group of analog subarrays respectively, the method includes:

performing a change on a first dimension of the first group of analog subarrays; performing a change on a second dimension of the second group of analog subarrays; and performing a change on one or both of the first and second dimensions of the third group of analog subarrays;

alternatively, performing a change on a second dimension of the first group of analog subarrays; performing a change on a first dimension of the second group of analog subarrays; and performing a change on one or both of the first and second dimensions of the third group of analog subarrays;

alternatively, performing a change on one or both of a first and second dimensions of the first group of analog subarrays; performing a change on the first dimension of the second group of analog subarrays; and performing a change on the second dimension of the third group of analog subarrays;

alternatively, performing a change on one or both of a first and second dimensions of the first group of analog subarrays; performing a change on the second dimension of the second group of analog subarrays; and performing a change on the first dimension of the third group of analog subarrays;

alternatively, performing a change on a first dimension of the first group of analog subarrays; performing a change on one or both of the first and a second dimensions of the second group of analog subarrays; and performing a change on the second dimension of the third group of analog subarrays;

alternatively, performing a change on a second dimension of the first group of analog subarrays; performing a change on one or both of a first and the second dimensions of the second group of analog subarrays; and performing a change on the first dimension of the third group of analog subarrays.

The first dimension may be an azimuth dimension and the second dimension may be a vertical dimension. Alternatively, the first dimension may be a vertical dimension and the second dimension may be an azimuth dimension. The first dimension and the second dimension may also be other dimensions, which are not limited by the embodiments of the present disclosure.

In an embodiment of the present disclosure, for each group of analog subarrays, the difference between the phase centers of the two analog subarrays can be changed by changing the phase centers of both of the two analog subarrays, or by changing the phase center of one of the two analog subarrays.

In an embodiment of the present disclosure, the phase center can be changed in any of the following modes.

In the first mode, some radiators in a analog subarray are directly turned off, which will cause the phase center of the analog subarray to shift. In an implementation, for each group of analog subarrays, a difference between phase centers of the two analog subarrays is changed by turning off part of radiators of one of the analog subarrays or part of radiators of the two analog subarrays.

For example, as shown in FIG. 5, the filled circle in FIG. 5 represents the equivalent phase center of each analog subarray. FIG. 5(*a*) shows the schematic diagram of the phase center before changing, FIG. 5(*b*) shows the schematic diagram of changing the phase center in an azimuth dimension, and FIG. 5(*c*) shows the schematic diagram of changing the phase center in a vertical dimension.

In FIG. 5(*b*), the last column of radiators of the first analog subarray and the first column of radiators of the second analog subarray are turned off, thus causing the difference between phase centers to change in the azimuth dimension. In FIG. 5(*c*), the last row of radiators of the first analog subarray and the first row of radiators of the second analog subarray are turned off, thus causing the difference between phase centers to change in the vertical dimension.

In the second mode, an equivalent signal processing can be adopted for radiators that cannot be properly turned off (such as analog radiators only subjected to constant modulus phase modulation), so that the radiators that need to be turned off can form a beam nulling or a low sidelobe in the observable area. As shown in FIG. 6, some radiators of the analog subarray form an effective receiving beam pointing to the observable area, while the other radiators form a blocking beam pointing to the non-observable area, so that the radiators forming the blocking beam are equivalent to being turned off, thus causing the change of the equivalent phase center of the analog subarray. That is, for each group of analog subarrays, a difference between phase centers of the two analog subarrays is changed, by forming a blocking beam pointed to a non-observable area or forming a beam nulling or a low sidelobe at an observable area, through radiators which need to be turned off in one or both of the two analog subarrays.

At step 702, a Direction Of Arrival (DOA) of a receiving signal is estimated, and a center of a receiving beam is directed to the estimated DOA, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays, the first signals and the second signals received by the third group of analog subarrays, the difference between phase centers before change and the difference between phase centers after change of the third group of analog subarrays.

In an embodiment of the present disclosure, estimating a DOA of a receiving signal includes: establishing an equation set with $\sin\theta\cos\phi$, $\sin\theta\sin\phi$ and $\cos\theta$ as unknowns, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays, and the first signals and the second signals received by the third group of analog subarrays, the difference between phase centers before change and the difference between phase centers after change of the third group of analog subarrays; where $\theta$ is a zenith angle of the DOA, $\phi$ is an azimuth of the DOA; obtaining $\sin\theta\cos\phi$, $\sin\theta\sin\phi$ and $\cos\theta$ by solving the equation set; and calculating $\theta$ and $\phi$ according to $\sin\theta\cos\phi$, $\sin\theta\sin\phi$ and $\cos\theta$.

In an example, establishing an equation set with $\sin\theta\cos\phi$, $\sin\theta\sin\phi$ and $\cos\theta$ as unknowns includes: determining a eighth difference value, a ninth difference value and a tenth difference value, according to the difference between phase centers before the change and the difference between phase centers after the change of the first group of analog subarrays, the difference between phase centers before the change and the difference between phase centers after the change of the second group of analog subarrays, and the difference between phase centers before the change and the difference between phase centers after the change of the third group of analog subarrays, respectively; and establishing an equation set with $\sin\theta\cos\phi$, $\sin\theta\sin\phi$ and $\cos\theta$ as unknowns, according to the first signals and the second signals received by the first group of analog subarrays, the first signals and the second signals received by the second group of analog subarrays, the first signals and the second signals received by the third group of analog subarrays, the eighth difference value, the ninth difference value and the tenth difference value.

The eighth difference value is a difference value between the difference between phase centers before the change and the difference between phase centers after the change, of the first group of analog subarrays, the ninth difference value is a difference value between the difference between phase centers before the change and the difference between phase centers after the change, of the second group of analog subarrays, and the tenth difference value is a difference value between the difference between phase centers before the change and the difference between phase centers after the change, of the third group of analog subarrays.

Alternatively, the eighth difference value is a difference value between the difference between phase centers after the change and the difference between phase centers before the change, of the first group of analog subarrays, the ninth difference value is a difference value between the difference between phase centers after the change and the difference between phase centers before the change, of the second group of analog subarrays, and the tenth difference value is a difference value between the difference between phase centers after the change and the difference between phase centers before the change, of the third group of analog subarrays.

In an example, based on formulas (2), (3), (6), (7), (9) and (10), by taking a measurement result before changing the phase centers as a reference signal, the following equation set can be established:

$$\begin{cases} \arg\{r'_1(k)\cdot r'^*_2(k)\cdot[r_1(k)\cdot r^*_2(k)]^*\} + 2n'\pi = \\ \frac{2\pi}{\lambda}((\Delta x'_1 - \Delta x_1)\sin\theta\cos\phi + (\Delta y'_1 - \Delta y_1)\sin\theta\sin\phi + (\Delta z'_1 - \Delta z_1)\cos\theta); \\ \arg\{r'_3(k)\cdot r'^*_4(k)\cdot[r_3(k)\cdot r^*_4(k)]^*\} + 2n''\pi \\ = \frac{2\pi}{\lambda}((\Delta x'_2 - \Delta x_2)\sin\theta\cos\phi + (\Delta y'_2 - \Delta y_2)\sin\theta\sin\phi + (\Delta z'_2 - \Delta z_2)\cos\theta); \\ \arg\{r'_5(k)\cdot r'^*_6(k)\cdot[r_5(k)\cdot r^*_6(k)]^*\} + 2n'''\pi \\ = \frac{2\pi}{\lambda}((\Delta x'_3 - \Delta x_3)\sin\theta\cos\phi + (\Delta y'_3 - \Delta y_3)\sin\theta\sin\phi + (\Delta z'_3 - \Delta z_3)\cos\theta) \end{cases}$$

Of course, a measurement result after the first change between the phase centers can also be used as a reference signal, a measurement result after the second change between the phase centers can be used as a reference signal, or a measurement result after the third change between the phase centers can be used as a reference signal, which is not limited by the embodiments of the present disclosure.

When the change of the difference between the phase centers in the first dimension or the second dimension is less than or equal to the half wavelength of the carrier wave, a unique solution can be obtained in the whole spatial domain, and at this time, n'=n''=n'''=0. In most cases, the observable area for signals with effective strength is limited, so the change of the difference between the phase centers in two dimensions can be allowed to be larger than the half wavelength of the carrier wave.

As a special example in this case, if the two analog subarrays are located in the plane of the yoz two-dimensional coordinate system, and if the difference between the phase centers of the two analog subarrays changes by $d_H$ in the azimuth dimension and remains unchanged in the vertical dimension, then $d_H \leq \lambda/|\sin \varphi_{max} - \sin \varphi_{min}|$ needs to be satisfied if the only solution without ambiguity is to be obtained from between azimuths $\varphi_{min}$ and $\varphi_{max}$.

In fact, when it is determined that the received signal is received from the main lobe, the allowed range of $d_H$ is larger. Similarly, if the difference between the phase centers of the two analog subarrays changes by $d_V$ in the vertical dimension and remains unchanged in the azimuth dimension, then $d_V \leq \lambda/|\sin \theta_{max} - \sin \theta_{min}|$ needs to be satisfied if the only solution without ambiguity is to be obtained from between zenith angles $\theta_{min}$ and $\theta_{max}$.

According to the embodiments of the present disclosure, the beam alignment is realized based on the change of the difference between the phase centers of three groups of analog subarrays, and the beam alignment can be realized only by carrying out at least two measurements, so that the system overhead and the time for beam alignment are reduced; and the beam alignment is realized by estimating the DOA, the estimated DOA is not limited by the scanning interval, thus the accuracy of beam alignment is improved. As shown in FIG. 3(a), beam alignment can be achieved by adopting the embodiments of the present disclosure even in the case of sidelobe reception (such as non-hot spots), as shown in FIG. 3(b), thereby reducing the number of scanning beams and system overhead in non-hot spots and quickly achieving high-precision beam alignment. Moreover, after the DOA of the received signal is estimated, the scanning of subsequent receiving beams can be stopped, and the transmitting end can be notified to stop transmitting new signals, thereby shortening the scanning time and overhead.

In an embodiment of the present disclosure, either a wide beam or a narrow beam can be used for scanning and receiving. After receiving a signal with effective strength, the subsequent beam scanning can be stopped, but the beam direction can be kept unchanged for measurement and estimation, thus shortening the scanning time and reducing the system overhead.

Another embodiment of the present disclosure provides a device for realizing beam alignment, including a processor, and a computer-readable storage medium storing instructions which, when executed by the processor, cause the processor to perform any one of above methods for realizing beam alignment.

Another embodiment of the present disclosure provides a computer-readable storage medium storing instructions which, when executed by the processor, cause the processor to perform any one of above methods for realizing beam alignment.

Figure 8:
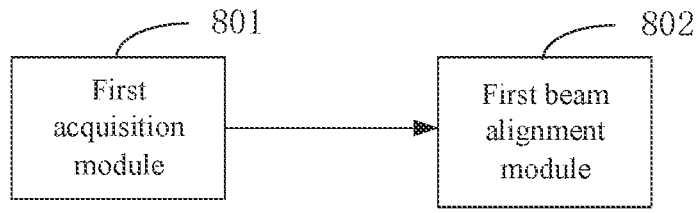
FIG. 8 is a structural diagram of a device for realizing beam alignment according to another embodiment of the present disclosure.

Referring to FIG. 8, another embodiment of the present disclosure provides a device for realizing beam alignment, which includes the following modules.

A first acquisition module 801 is configured to:
in response to a reception of first signals with effective signal strengths through two analog subarrays with a same polarization mode by adopting receiving beams having a same beam direction, acquire the first signals received by the two analog subarrays, and a difference between phase centers of the two analog subarrays;

keep the beam directions of the receiving beams of the two analog subarrays unchanged, perform a first change of the difference between phase centers of the two analog subarrays, and acquire second signals received by the two analog subarrays and a difference between the phase centers after the first change of the two analog subarrays;

keep the beam directions of the receiving beams of the two analog subarrays unchanged, perform a second change of the difference between phase centers of the two analog subarrays, and acquire third signals received by the two analog subarrays and a difference between the phase centers after the second change of the two analog subarrays.

A first beam alignment module 802 is configured to: estimate a Direction Of Arrival (DOA) of a receiving signal, according to the first signals, the second signals and the third signals received by the two analog subarrays, the difference between phase centers before the first change, the difference between phase centers after the first change and the difference between phase centers after the second change; and direct a center of a receiving beam to the estimated DOA.

In an embodiment of the present disclosure, the first acquisition module 801 is further configured to: keep the beam directions of the receiving beams of the two analog subarrays unchanged, perform a third change of the difference between phase centers of the two analog subarrays, and acquire fourth signals received by the two analog subarrays and a difference between the phase centers after the third change of the two analog subarrays.

The first beam alignment module 802 is configured to: estimate a DOA of a receiving signal, according to the first signals, the second signals, the third signals and the fourth signals received by the two analog subarrays, the difference between phase centers before the first change, the difference between phase centers after the first change, the difference between phase centers after the second change and the difference between phase centers after the third change.

In an embodiment of the present disclosure, the first beam alignment module 802 is configured to estimate a DOA of a receiving signal by adopting the following: establishing an equation set with $\sin \theta \cos \phi$, $\sin \theta \sin \phi$ and $\cos \theta$ as unknowns, according to the first signals, the second signals, the third signals and the fourth signals received by the two analog subarrays, the difference between phase centers before the first change, the difference between phase centers after the first change, the difference between phase centers after the second change and the difference between phase centers after the third change, where $\theta$ is a zenith angle of the DOA, $\phi$ is an azimuth of the DOA; obtaining $\sin \theta \cos \phi$, $\sin \theta \sin \phi$ and $\cos \theta$, by solving the equation set; and calculating $\theta$ and $\phi$ according to $\sin \theta \cos \phi$, $\sin \theta \sin \phi$ and $\cos \theta$.

In an embodiment of the present disclosure, the first beam alignment module 802 is configured to establish an equation set with $\sin \theta \cos \phi$, $\sin \theta \sin \phi$ and $\cos \theta$ as unknowns by adopting the following: determining a first difference value, a second difference value and a third difference value, according to the difference between phase centers before the first change, the difference between phase centers after the first change, the difference between phase centers after the second change and the difference between phase centers after the third change; and establishing an equation set with $\sin \theta \cos \phi$, $\sin \theta \sin \phi$ and $\cos \theta$ as unknowns, according to the first signals, the second signals, the third signals, the fourth signals, the first difference value, the second difference value and the third difference value.

The first difference value is a difference value between the difference between phase centers after the first change and the difference between phase centers before the first change, the second difference value is a difference value between the difference between phase centers after the second change and the difference between phase centers before the first change, and the third difference value is a difference value between the difference between phase centers after the third change and the difference between phase centers before the first change.

Alternatively, the first difference value is a difference value between the difference between phase centers before the first change and the difference between phase centers after the first change, the second difference value is a difference value between the difference between phase centers after the second change and the difference between phase centers after the first change, and the third difference value is a difference value between the difference between phase centers after the third change and the difference between phase centers after the first change.

Alternatively, the first difference value is a difference value between the difference between phase centers before the first change and the difference between phase centers after the second change, the second difference value is a difference value between the difference between phase centers after the first change and the difference between phase centers after the second change, and the third difference value is a difference value between the difference between phase centers after the third change and the difference between phase centers after the second change.

Alternatively, the first difference value is a difference value between the difference between phase centers before the first change and the difference between phase centers after the third change, the second difference value is a difference value between the difference between phase centers after the first change and the difference between phase centers after the third change, and the third difference value is a difference value between the difference between phase centers after the second change and the difference between phase centers after the third change.

In an embodiment of the present disclosure, the first acquisition module 801 is configured to perform the change of phase centers by the following modes.

In an implementation, a difference between phase centers of the two analog subarrays is changed by turning off part of radiators of one of the analog subarrays or part of radiators of the two analog subarrays.

Alternatively, a difference between phase centers of the two analog subarrays is changed, by forming a blocking beam pointed to a non-observable area or forming a beam nulling or a low sidelobe at an observable area, through radiators which need to be turned off in one or both of the two analog subarrays.

In an embodiment of the present disclosure, the first acquisition module 801 is configured to perform the change of phase centers by the following modes.

The first change of a difference between phase centers of the two analog subarrays is performed on a first dimension of the two analog subarrays; and the second change of a difference between phase centers of the two analog subarrays is performed on a second dimension of the two analog subarrays.

Alternatively, the first change of a difference between phase centers of the two analog subarrays is performed on a second dimension of the two analog subarrays; and the second change of a difference between phase centers of the two analog subarrays is performed on a first dimension of the two analog subarrays.

Alternatively, the first change of a difference between phase centers of the two analog subarrays is performed on a first and second dimensions of the two analog subarrays; and the second change of a difference between phase centers of the two analog subarrays is performed on one or both of the first and second dimensions of the two analog subarrays.

Alternatively, the first change of a difference between phase centers of the two analog subarrays is performed on one or both of a first and second dimensions of the two analog subarrays; and the second change of a difference between phase centers of the two analog subarrays is performed on the first and second dimensions of the two analog subarrays.

In an embodiment of the present disclosure, all of the first signals, the second signals, the third signals, the difference between phase centers before the first change, the difference between phase centers after the first change and the difference between phase centers after the second change are values in a global coordinate system.

The coordinates on the first and second dimensions of the first difference value in the global coordinate system are 0, and the coordinate on the third dimension of the second difference value in the global coordinate system is 0.

Alternatively, the coordinates on the first and second dimensions of the second difference value in the global coordinate system are 0, and the coordinate on the third dimension of the first difference value in the global coordinate system is 0.

The first difference value is a difference value between the difference between phase centers after the first change and the difference between phase centers before the first change, and the second difference value is a difference value between the difference between phase centers after the second change and the difference between phase centers before the first change.

Alternatively, the first difference value is a difference value between the difference between phase centers before the first change and the difference between phase centers after the first change, and the second difference value is a difference value between the difference between phase centers after the second change and the difference between phase centers after the first change.

Alternatively, the first difference value is a difference value between the difference between phase centers before the first change and the difference between phase centers after the second change, and the second difference value is a difference value between the difference between phase centers after the first change and the difference between phase centers after the second change.

In an embodiment of the present disclosure, all of the first signals, the second signals, the third signals, the difference between phase centers before the first change, the difference between phase centers after the first change and the difference between phase centers after the second change are values in a local coordinate system.

The coordinate on the first dimension of the first difference value in the local coordinate system is 0, and the coordinate on the second dimension of the second difference value in the local coordinate system is 0.

Alternatively, the coordinate on the first dimension of the second difference value in the local coordinate system is 0, and the coordinate on the second dimension of the first difference value in the local coordinate system is 0.

The first difference value is a difference value between the difference between phase centers after the first change and the difference between phase centers before the first change, and the second difference value is a difference value between the difference between phase centers after the second change and the difference between phase centers before the first change.

Alternatively, the first difference value is a difference value between the difference between phase centers before the first change and the difference between phase centers after the first change, and the second difference value is a difference value between the difference between phase centers after the second change and the difference between phase centers after the first change.

Alternatively, the first difference value is a difference value between the difference between phase centers before the first change and the difference between phase centers after the second change, and the second difference value is a difference value between the difference between phase centers after the first change and the difference between phase centers after the second change.

In an embodiment of the present disclosure, the first beam alignment module 802 is configured to estimate a DOA of a receiving signal by adopting the following:
  determining a first objective function, according to the first signals, the second signals and the third signals received by the two analog subarrays, the difference between phase centers before the first change, the difference between phase centers after the first change and the difference between phase centers after the second change;
  traversing all desirable DOAs to obtain a value of the first objective function corresponding to each of the desirable DOAs, and take a DOA with a smallest value of the first objective function as the estimated DOA.

In an embodiment of the present disclosure, the first beam alignment module 802 is configured to estimate a DOA of a receiving signal by adopting the following: establishing an equation set with $\theta$ and $\phi$ as unknowns, according to the first signals, the second signals and the third signals received by the two analog subarrays, the difference between phase centers before the first change, the difference between phase centers after the first change and the difference between phase centers after the second change, where $\theta$ is a zenith angle of the DOA, $\phi$ is an azimuth of the DOA; and obtaining $\theta$ and $\phi$ by solving the equation set.

In an embodiment of the present disclosure, the first beam alignment module 802 is configured to establish an equation set with $\theta$ and $\phi$ as unknowns by adopting the following: determining a first difference value and a second difference value, according to the difference between phase centers before the first change, the difference between phase centers after the first change and the difference between phase centers after the second change; and establishing an equation set with $\theta$ and $\phi$ as unknowns, according to the first signals, the second signals, the third signals, the first difference value and the second difference value.

The first difference value is a difference value between the difference between phase centers after the first change and the difference between phase centers before the first change, and the second difference value is a difference value between the difference between phase centers after the second change and the difference between phase centers before the first change.

Alternatively, the first difference value is a difference value between the difference between phase centers before the first change and the difference between phase centers after the first change, and the second difference value is a difference value between the difference between phase centers after the second change and the difference between phase centers after the first change.

Alternatively, the first difference value is a difference value between the difference between phase centers before the first change and the difference between phase centers after the second change, and the second difference value is a difference value between the difference between phase centers after the first change and the difference between phase centers after the second change.

The implementation of the above-mentioned devices for realizing beam alignment are the same as the implementation process of the methods for realizing beam alignment in the previous embodiments, and will not be repeated herein.

Figure 9:
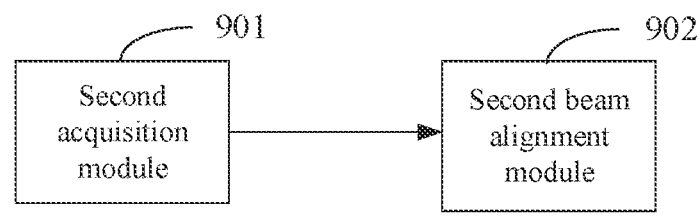
FIG. 9 is a structural diagram of a device for realizing beam alignment according to another embodiment of the present disclosure.

Referring to FIG. 9, another embodiment of the present disclosure provides a device for realizing beam alignment, which includes the following modules.

A second acquisition module 901 is configured to:
  in response to a reception of first signals with effective signal strengths through a first group of analog subarrays and a second group of analog subarrays by adopting receiving beams having a same beam direction, acquire the first signals received by the first group of analog subarrays, the first signals received by the second group of analog subarrays, a difference between phase centers of two analog subarrays in the first group of analog subarrays, and a difference between phase centers of two analog subarrays in the second group of analog subarrays; where each of the first and second group of analog subarrays includes two analog subarrays with a same polarization mode;
  keep the beam directions of the receiving beams of the first group of analog subarrays and the second group of analog subarrays unchanged, perform a first change of the difference between phase centers of the first group of analog subarrays, acquire second signals received by the first group of analog subarrays and a difference between phase centers after the first change of the first group of analog subarrays, perform a first change of the difference between phase centers of the second group of analog subarrays, and acquire second signals received by the second group of analog subarrays and a difference between phase centers after the first change of the second group of analog subarrays.

A second beam alignment module 902 is configured to: estimate a Direction Of Arrival (DOA) of a receiving signal, and direct a center of a receiving beam to the estimated DOA, according to the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays.

In an embodiment of the present disclosure, the second acquisition module 901 is further configured to:
  keep the beam directions of the receiving beams of the first group of analog subarrays and the second group of analog subarrays unchanged, perform a second change of the difference between phase centers of the first group of analog subarrays, acquire third signals received by the first group of analog subarrays and a difference between phase centers after the second change of the first group of analog subarrays;

alternatively, keep the beam directions of the receiving beams of the first group of analog subarrays and the second group of analog subarrays unchanged, perform a second change of the difference between phase centers of the second group of analog subarrays, acquire third signals received by the second group of analog subarrays and a difference between phase centers after the second change of the second group of analog subarrays.

The second beam alignment module 902 is configured to estimate a DOA of a receiving signal by adopting the following:
estimating a DOA of a receiving signal, according to the first signals, the second signals and the third signals received by the first group of analog subarrays, the difference between phase centers before the first change, the difference between phase centers after the first change and the difference between phase centers after the second change of the first group of analog subarrays, the first signals and the second signals received by the second group of analog subarrays, the difference between phase centers before the first change and the difference between phase centers after the first change of the second group of analog subarrays;
alternatively, estimating a DOA of a receiving signal, according to the first signals and the second signals received by the first group of analog subarrays, the difference between phase centers before the first change and the difference between phase centers after the first change of the first group of analog subarrays, the first signals, the second signals and the third signals received by the second group of analog subarrays, the difference between phase centers before the first change, the difference between phase centers after the first change and the difference between phase centers after the second change of the second group of analog subarrays.

In an embodiment of the present disclosure, the second beam alignment module 902 is configured to estimate a DOA of a receiving signal by adopting the following:
establishing an equation set with $\sin\theta\cos\phi$, $\sin\theta\sin\phi$ and $\cos\theta$ as unknowns, according to the first signals, the second signals and the third signals received by the first group of analog subarrays, the difference between phase centers before the first change, the difference between phase centers after the first change and the difference between phase centers after the second change of the first group of analog subarrays, the first signals and the second signals received by the second group of analog subarrays, the difference between phase centers before the first change and the difference between phase centers after the first change of the second group of analog subarrays, where $\theta$ is a zenith angle of the DOA, $\phi$ is an azimuth of the DOA; obtaining $\sin\theta\cos\phi$, $\sin\theta\sin\phi$ and $\cos\theta$ by solving the equation set; and calculating $\theta$ and $\phi$ according to $\sin\theta\cos\phi$, $\sin\theta\sin\phi$ and $\cos\theta$;
alternatively, establishing an equation set with $\sin\theta\cos\phi$, $\sin\theta\sin\phi$ and $\cos\theta$ as unknowns, according to the first signals and the second signals received by the first group of analog subarrays, the difference between phase centers before the first change and the difference between phase centers after the first change of the first group of analog subarrays, the first signals, the second signals and the third signals received by the second group of analog subarrays, the difference between phase centers before the first change, the difference between phase centers after the first change and the difference between phase centers after the second change of the second group of analog subarrays; obtaining $\sin\theta\cos\phi$, $\sin\theta\sin\phi$ and $\cos\theta$ by solving the equation set; and calculating $\theta$ and $\phi$ according to $\sin\theta\cos\phi$, $\sin\theta\sin\phi$ and $\cos\theta$.

In an embodiment of the present disclosure, the polarization modes of different groups of analog subarrays can be the same or different.

In an embodiment of the present disclosure, the two analog subarrays in the first group of analog subarrays, and the two analog subarrays in the second group of analog subarrays, are different analog subarrays respectively.

Alternatively, one of the first group of analog subarrays is the same as one of the second group of analog subarrays.

In an embodiment of the present disclosure, the second acquisition module 902 is configured to perform the change of phase centers by the following modes.

In an implementation, for each group of analog subarrays, a difference between phase centers of the two analog subarrays is changed by turning off part of radiators of one of the analog subarrays or part of radiators of the two analog subarrays.

Alternatively, for each group of analog subarrays, a difference between phase centers of the two analog subarrays is changed, by forming a blocking beam pointed to a non-observable area or forming a beam nulling or a low sidelobe at an observable area, through radiators which need to be turned off in one or both of the two analog subarrays.

In an embodiment of the present disclosure, the second acquisition module 902 is configured to perform the change of phase centers by the following modes.

When performing the first change of a difference between phase centers of the first and second group of analog subarrays respectively,
the first change on a first dimension of the first group of analog subarrays is performed; and the first change on a second dimension of the second group of analog subarrays is performed;
alternatively, the first change on a second dimension of the first group of analog subarrays is performed; and the first change on a first dimension of the second group of analog subarrays is performed;
alternatively, the first change on a first and second dimensions of the first group of analog subarrays is performed; and the first change on one or both of the first and second dimensions of the second group of analog subarrays is performed;
alternatively, the first change on one or both of a first and second dimensions of the first group of analog subarrays is performed; and the first change on the first and second dimensions of the second group of analog subarrays is performed.

In an embodiment of the present disclosure, the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays are values in a global coordinate system.

The coordinates on the first and second dimensions of the fourth difference value in the global coordinate system are 0, and the coordinate on the third dimension of the fifth difference value in the global coordinate system is 0.

Alternatively, the coordinates on the first and second dimensions of the fifth difference value in the global coordinate system are 0, and the coordinate on the third dimension of the fourth difference value in the global coordinate system is 0.

The fourth difference value is a difference value between the difference between phase centers after the first change and the difference between phase centers before the first change, of the first group of analog subarrays, and the fifth difference value is a difference value between the difference between phase centers after the first change and the difference between phase centers before the first change, of the second group of analog subarrays.

Alternatively, the fourth difference value is a difference value between the difference between phase centers before the first change and the difference between phase centers after the first change, of the first group of analog subarrays, and the fifth difference value is a difference value between the difference between phase centers before the first change and the difference between phase centers after the first change, of the second group of analog subarrays.

In an embodiment of the present disclosure, the first signals and the second signals received by the first group of analog subarrays, the difference between phase centers before the first change and the difference between phase centers after the first change of the first group of analog subarrays, the first signals and the second signals received by the second group of analog subarrays, the difference between phase centers before the first change and the difference between phase centers after the first change of the second group of analog subarrays are values in a global coordinate system.

The coordinate on the first dimension of the fourth difference value in the local coordinate system is 0, and the coordinate on the second dimension of the fifth difference value in the local coordinate system is 0.

Alternatively, the coordinate on the first dimension of the fifth difference value in the local coordinate system is 0, and the coordinate on the second dimension of the fourth difference value in the local coordinate system is 0.

The fourth difference value is a difference value between the difference between phase centers after the first change and the difference between phase centers before the first change, of the first group of analog subarrays, and the fifth difference value is a difference value between the difference between phase centers after the first change and the difference between phase centers before the first change, of the second group of analog subarrays.

Alternatively, the fourth difference value is a difference value between the difference between phase centers before the first change and the difference between phase centers after the first change, of the first group of analog subarrays, and the fifth difference value is a difference value between the difference between phase centers before the first change and the difference between phase centers after the first change, of the second group of analog subarrays.

In an embodiment of the present disclosure, the second beam alignment module 902 is configured to estimate a DOA of a receiving signal by adopting the following.

A second objective function is determined, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays; all desirable DOAs are traversed to obtain a value of the second objective function corresponding to each of the desirable DOAs, and a DOA with a smallest value of the second objective function is taken as the estimated DOA.

In an embodiment of the present disclosure, the second beam alignment module 902 is configured to estimate a DOA of a receiving signal by adopting the following.

An equation set with $\theta$ and $\phi$ as unknowns is established, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays; where $\theta$ is a zenith angle of the DOA, $\phi$ is an azimuth of the DOA; and the equation set is solved to obtain $\theta$ and $\phi$.

In an embodiment of the present disclosure, the second beam alignment module 902 is configured to establish an equation set with $\theta$ and $\phi$ as unknowns by adopting the following: determining a fourth difference value and a fifth difference value, according to the difference between phase centers before change and the difference between phase centers after change of the first group of analog subarrays, and the difference between phase centers before change and the difference between phase centers after change of the second group of analog subarrays, respectively; and establishing an equation set with $\theta$ and $\phi$ as unknowns, according to the first signals and the second signals received by the first group of analog subarrays, the first signals and the second signals received by the second group of analog subarrays, the fourth difference value and the fifth difference value.

The fourth difference value is a difference value between the difference between phase centers after the first change and the difference between phase centers before the first change, of the first group of analog subarrays, and the fifth difference value is a difference value between the difference between phase centers after the first change and the difference between phase centers before the first change, of the second group of analog subarrays.

Alternatively, the fourth difference value is a difference value between the difference between phase centers before the first change and the difference between phase centers after the first change, of the first group of analog subarrays, and the fifth difference value is a difference value between the difference between phase centers before the first change and the difference between phase centers after the first change, of the second group of analog subarrays.

The implementation of the above-mentioned devices for realizing beam alignment are the same as the implementation process of the methods for realizing beam alignment in the previous embodiments, and will not be repeated herein.

Figure 10:
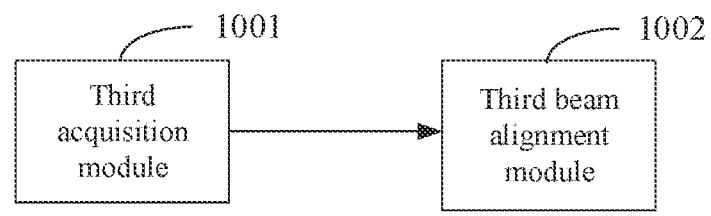
FIG. 10 is a structural diagram of a device for realizing beam alignment according to another embodiment of the present disclosure.

Referring to FIG. 10, another embodiment of the present disclosure provides a device for realizing beam alignment, which includes the following modules.

A third acquisition module 1001 is configured to:
in response to a reception of first signals with effective signal strengths through a first group of analog subarrays, a second group of analog subarrays and a third group of analog subarrays by adopting receiving beams having a same beam direction, acquire the first signals received by the first group of analog subarrays, the first signals received by the second group of analog subarrays, the first signals received by the third group of analog subarrays, a difference between phase centers of two analog subarrays in the first group of analog subarrays, a difference between phase centers of two analog subarrays in the second group of analog subarrays, and a difference between phase centers of two analog subarrays in the third group of analog subarrays; where each of the first, second and third group of analog subarrays includes two analog subarrays with a same polarization mode;

keep the beam directions of the receiving beams of the first group of analog subarrays, the second group of analog subarrays and the third group of analog subarrays unchanged, perform a change of the difference between phase centers of the first group of analog subarrays, acquire second signals received by the first group of analog subarrays and a difference between phase centers after change of the first group of analog subarrays, perform a change of the difference between phase centers of the second group of analog subarrays, acquire second signals received by the second group of analog subarrays and a difference between phase centers after change of the second group of analog subarrays, and perform a change of the difference between phase centers of the third group of analog subarrays, acquire second signals received by the third group of analog subarrays and a difference between phase centers after change of the third group of analog subarrays.

A third beam alignment module 1002 is configured to: estimate a Direction Of Arrival (DOA) of a receiving signal, and direct a center of a receiving beam to the estimated DOA, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays, the first signals and the second signals received by the third group of analog subarrays, the difference between phase centers before change and the difference between phase centers after change of the third group of analog subarrays.

In an embodiment of the present disclosure, the third beam alignment module 1002 is configured to estimate a DOA of a receiving signal by adopting the following: establishing an equation set with sin θ cos φ, sin θ sin φ and cos θ as unknowns, according to the first signals and the second signals received by the first group of analog subarrays, the difference between phase centers before change and the difference between phase centers after change of the first group of analog subarrays, the first signals and the second signals received by the second group of analog subarrays, the difference between phase centers before change and the difference between phase centers after change of the second group of analog subarrays, and the first signals and the second signals received by the third group of analog subarrays, the difference between phase centers before change and the difference between phase centers after change of the third group of analog subarrays; where θ is a zenith angle of the DOA, φ is an azimuth of the DOA; obtaining sin θ cos φ, sin θ sin φ and cos θ by solving the equation set; and calculating θ and φ according to sin cos φ, sin θ sin φ and cos θ.

In an embodiment of the present disclosure, the polarization modes of different groups of analog subarrays can be the same or different.

In an embodiment of the present disclosure, the two analog subarrays in the first group of analog subarrays, the two analog subarrays in the second group of analog subarrays, and the two analog subarrays in the third group of analog subarrays, are different analog subarrays respectively.

Alternatively, one of any two or three groups of analog subarrays in the first, second and third groups of analog subarrays is identical to another one of the other of the any two or three groups of analog subarrays.

In an embodiment of the present disclosure, the third acquisition module 1001 is configured to perform the change of phase centers by the following modes.

In an implementation, for each group of analog subarrays, a difference between phase centers of the two analog subarrays is changed by turning off part of radiators of one of the analog subarrays or part of radiators of the two analog subarrays.

Alternatively, for each group of analog subarrays, a difference between phase centers of the two analog subarrays is changed, by forming a blocking beam pointed to a non-observable area or forming a beam nulling or a low sidelobe at an observable area, through radiators which need to be turned off in one or both of the two analog subarrays.

In an embodiment of the present disclosure, the third acquisition module 1001 is configured to perform the change of phase centers by the following modes.

When performing the change of a difference between phase centers of the three groups of analog subarrays respectively, a change on a first dimension of the first group of analog subarrays is performed; a change on a second dimension of the second group of analog subarrays is performed; and a change on one or both of the first and second dimensions of the third group of analog subarrays is performed;

alternatively, a change on a second dimension of the first group of analog subarrays is performed; a change on a first dimension of the second group of analog subarrays is performed; and a change on one or both of the first and second dimensions of the third group of analog subarrays is performed;

alternatively, a change on one or both of a first and second dimensions of the first group of analog subarrays is performed; a change on the first dimension of the second group of analog subarrays is performed; and a change on the second dimension of the third group of analog subarrays is performed;

alternatively, a change on one or both of a first and second dimensions of the first group of analog subarrays is performed; a change on the second dimension of the second group of analog subarrays is performed; and a change on the first dimension of the third group of analog subarrays is performed;

alternatively, a change on a first dimension of the first group of analog subarrays is performed; a change on one or both of the first and a second dimensions of the second group of analog subarrays is performed; and a change on the second dimension of the third group of analog subarrays is performed;

alternatively, a change on a second dimension of the first group of analog subarrays is performed; a change on one or both of a first and the second dimensions of the second group of analog subarrays is performed; and a change on the first dimension of the third group of analog subarrays is performed.

The implementation of the above-mentioned devices for realizing beam alignment are the same as the implementation process of the methods for realizing beam alignment in the previous embodiments, and will not be repeated herein.

Those having ordinary skills in the art can understand that all or some of the steps of the methods, systems, and all or some of the functional modules/units in the devices disclosed above, can be implemented as software, firmware, hardware and appropriate combinations thereof. In the hardware implementation, the division between functional modules/units mentioned in the above description does not necessarily correspond to the division of physical components. For example, a physical component may have multiple functions, or a function or step may be cooperatively performed by several physical components. Some or all of the components may be implemented as software executed by a processor, such as a digital signal processor or a microprocessor, or as hardware, or as an integrated circuit, such as an application specific integrated circuit. Such software can be distributed on computer-readable media, which can include computer storage media (or non-transitory media) and communication media (or transitory media). As well known to those having ordinary skills in the art, the term computer storage media includes volatile and nonvolatile, removable and non-removable media implemented in any method or technology for storing information, such as computer-readable instructions, data structures, program modules or other data. Computer storage media include but are not limited to RAM, ROM, EEPROM, flash memory or other memory technologies, CD-ROM, digital versatile disk (DVD) or other optical disk storage, magnetic boxes, magnetic tapes, magnetic disk storage or other magnetic storage devices, or any other media that can be used to store desired information and can be accessed by computers. Moreover, it is well known to those having ordinary skills in the art that communication media usually contain computer readable instructions, data structures, program modules or other data in a modulated data signal such as a carrier wave or other transmission mechanism, and can include any information delivery media.

Although the embodiments are disclosed in the present disclosure as described above, the contents described are only the implementations adopted for the convenience of understanding the embodiments of the present disclosure, and are not intended to limit the embodiments of the present disclosure. Without departing from the principles and scopes disclosed by the embodiments of the present disclosure, any person having ordinary skills in the art who belongs to the technical field of the embodiments of the present disclosure may make any modifications and changes in the implementations with respect to forms and details, but the scopes of protection of the embodiments of the present disclosure shall still be subject to the scope defined by the appended claims.

The invention claimed is:

1. A method for realizing beam alignment, comprising:
in response to a reception of first signals with effective signal strengths through two analog subarrays with a same polarization mode by adopting receiving beams having a same beam direction, acquiring the first signals received by the two analog subarrays, and a difference between phase centers of the two analog subarrays;
keeping the beam directions of the receiving beams of the two analog subarrays unchanged, performing a first change of the difference between the phase centers of the two analog subarrays, and acquiring second signals received by the two analog subarrays and the difference between the phase centers after the first change of the two analog subarrays;
keeping the beam directions of the receiving beams of the two analog subarrays unchanged, performing a second change of the difference between the phase centers of the two analog subarrays, and acquiring third signals received by the two analog subarrays and the difference between the phase centers after the second change of the two analog subarrays; and
estimating a Direction Of Arrival (DOA) of a receiving signal, according to the first signals, the second signals and the third signals received by the two analog subarrays, the difference between the phase centers before the first change, the difference between the phase centers after the first change and the difference between the phase centers after the second change; and
directing a center of a receiving beam to the estimated DOA.

2. The method according to claim 1, wherein before estimating the DOA of the receiving signal, the method further comprises:
keeping the beam directions of the receiving beams of the two analog subarrays unchanged, performing a third change of the difference between the phase centers of the two analog subarrays, and acquiring fourth signals received by the two analog subarrays and the difference between the phase centers after the third change of the two analog subarrays;
wherein estimating the DOA of the receiving signal comprises:
estimating the DOA of the receiving signal, according to the first signals, the second signals, the third signals and the fourth signals received by the two analog subarrays, the difference between the phase centers before the first change, the difference between the phase centers after the first change, the difference between the phase centers after the second change and the difference between the phase centers after the third change.

3. The method according to claim 2, wherein estimating the DOA of the receiving signal comprises:
establishing an equation set with $\sin\theta\cos\phi$, $\sin\theta\sin\phi$ and $\cos\theta$ as unknowns, according to the first signals, the second signals, the third signals and the fourth signals received by the two analog subarrays, the difference between the phase centers before the first change, the difference between the phase centers after the first change, the difference between the phase centers after the second change and the difference between the phase centers after the third change, wherein the $\theta$ is a zenith angle of the DOA, the $\phi$ is an azimuth of the DOA; obtaining the $\sin\theta\cos\phi$, the $\sin\theta\sin\phi$ and the $\cos\theta$ by solving the equation set; and calculating the $\theta$ and the $\phi$ according to the $\sin\theta\cos\phi$, the $\sin\theta\sin\phi$ and the $\cos\theta$.

4. The method according to claim 3, wherein establishing the equation set with the $\sin\theta\cos\phi$, the $\sin\theta\sin\phi$ and the $\cos\theta$ as unknowns comprises:
determining a first difference value, a second difference value and a third difference value, according to the difference between the phase centers before the first change, the difference between the phase centers after the first change, the difference between the phase centers after the second change and the difference between the phase centers after the third change; and establishing the equation set with the $\sin\theta\cos\phi$, the $\sin$ θ sin φ and the cos θ as unknowns, according to the first signals, the second signals, the third signals, the fourth signals, the first difference value, the second difference value and the third difference value;

wherein, the first difference value is a difference value between the difference between the phase centers after the first change and the difference between the phase centers before the first change, the second difference value is a difference value between the difference between the phase centers after the second change and the difference between the phase centers before the first change, and the third difference value is a difference value between the difference between the phase centers after the third change and the difference between the phase centers before the first change;

or, the first difference value is a difference value between the difference between the phase centers before the first change and the difference between the phase centers after the first change, the second difference value is a difference value between the difference between the phase centers after the second change and the difference between the phase centers after the first change, and the third difference value is a difference value between the difference between the phase centers after the third change and the difference between the phase centers after the first change;

or, the first difference value is a difference value between the difference between the phase centers before the first change and the difference between the phase centers after the second change, the second difference value is a difference value between the difference between the phase centers after the first change and the difference between the phase centers after the second change, and the third difference value is a difference value between the difference between the phase centers after the third change and the difference between the phase centers after the second change;

or, the first difference value is a difference value between the difference between the phase centers before the first change and the difference between the phase centers after the third change, the second difference value is a difference value between the difference between the phase centers after the first change and the difference between the phase centers after the third change, and the third difference value is a difference value between the difference between the phase centers after the second change and the difference between the phase centers after the third change.

5. The method according to claim 1, wherein the difference between the phase centers of the two analog subarrays is changed by turning off part of radiators of one of the two analog subarrays or part of radiators of the two analog subarrays;

or, the difference between the phase centers of the two analog subarrays is changed, by forming a blocking beam pointed to a non-observable area or forming a beam nulling or a low sidelobe at an observable area, through radiators which need to be turned off in one or both of the two analog subarrays.

6. The method according to claim 1, wherein the first change of the difference between the phase centers of the two analog subarrays is performed on a first dimension of the two analog subarrays; and the second change of the difference between the phase centers of the two analog subarrays is performed on a second dimension of the two analog subarrays;

or, the first change of the difference between the phase centers of the two analog subarrays is performed on a second dimension of the two analog subarrays; and the second change of the difference between the phase centers of the two analog subarrays is performed on a first dimension of the two analog subarrays;

or, the first change of the difference between the phase centers of the two analog subarrays is performed on first and second dimensions of the two analog subarrays; and the second change of the difference between the phase centers of the two analog subarrays is performed on one or both of the first dimension and the second dimension of the two analog subarrays;

or, the first change of the difference between the phase centers of the two analog subarrays is performed on one or both of first and second dimensions of the two analog subarrays; and the second change of the difference between the phase centers of the two analog subarrays is performed on the first dimension and the second dimension of the two analog subarrays.

7. The method according to claim 1, wherein estimating the DOA of the receiving signal comprises:

determining an objective function, according to the first signals, the second signals and the third signals received by the two analog subarrays, the difference between the phase centers before the first change, the difference between the phase centers after the first change and the difference between the phase centers after the second change; and traversing all desirable DOAs to obtain a value of the first objective function corresponding to each of the desirable DOAs, and take a DOA with a smallest value of the first objective function as the estimated DOA.

8. The method according to claim 1, wherein estimating the DOA of the receiving signal comprises:

establishing an equation set with θ and φ as unknowns, according to the first signals, the second signals and the third signals received by the two analog subarrays, the difference between the phase centers before the first change, the difference between the phase centers after the first change and the difference between the phase centers after the second change, wherein the θ is a zenith angle of the DOA, the φ is an azimuth of the DOA; and obtaining the θ and the φ by solving the equation set.

9. The method according to claim 8, wherein establishing the equation set with the θ and the φ as unknowns comprises:

determining a first difference value and a second difference value, according to the difference between the phase centers before the first change, the difference between the phase centers after the first change and the difference between the phase centers after the second change; and establishing the equation set with the θ and the φ as unknowns, according to the first signals, the second signals, the third signals, the first difference value and the second difference value;

wherein, the first difference value is a difference value between the difference between the phase centers after the first change and the difference between the phase centers before the first change, and the second difference value is a difference value between the difference between the phase centers after the second change and the difference between the phase centers before the first change;

or, the first difference value is a difference value between the difference between the phase centers before the first change and the difference between the phase centers after the first change, and the second difference value is a difference value between the difference between the phase centers after the second change and the difference between the phase centers after the first change;

or, the first difference value is a difference value between the difference between the phase centers before the first change and the difference between the phase centers after the second change, and the second difference value is a difference value between the difference between the phase centers after the first change and the difference between the phase centers after the second change.

10. A non-transitory computer-readable storage medium storing a computer program which, when executed by a processor, cause the processor to perform the method for realizing the beam alignment according to claim 1.

11. A device for realizing beam alignment, comprising a processor, and a computer-readable storage medium storing instructions which, when executed by the processor, cause the processor to perform a method for realizing the beam alignment, comprising:

in response to a reception of first signals with effective signal strengths through two analog subarrays with a same polarization mode by adopting receiving beams having a same beam direction, acquiring the first signals received by the two analog subarrays, and a difference between phase centers of the two analog subarrays;

keeping the beam directions of the receiving beams of the two analog subarrays unchanged, performing a first change of the difference between the phase centers of the two analog subarrays, and acquiring second signals received by the two analog subarrays and the difference between the phase centers after the first change of the two analog subarrays;

keeping the beam directions of the receiving beams of the two analog subarrays unchanged, performing a second change of the difference between the phase centers of the two analog subarrays, and acquiring third signals received by the two analog subarrays and the difference between the phase centers after the second change of the two analog subarrays; and estimating a Direction Of Arrival (DOA) of a receiving signal, according to the first signals, the second signals and the third signals received by the two analog subarrays, the difference between the phase centers before the first change, the difference between the phase centers after the first change and the difference between the phase centers after the second change; and directing a center of a receiving beam to the estimated DOA.

12. A method for realizing beam alignment, comprising:
in response to a reception of first signals with effective signal strengths through a first group of analog subarrays and a second group of the analog subarrays by adopting receiving beams having a same beam direction, acquiring the first signals received by the first group of the analog subarrays, the first signals received by the second group of the analog subarrays, a difference between phase centers of two analog subarrays in the first group of the analog subarrays, and a difference between phase centers of two analog subarrays in the second group of the analog subarrays; wherein each of the first and second group of the analog subarrays comprises two analog subarrays with a same polarization mode;

keeping the beam directions of the receiving beams of the first group of the analog subarrays and the second group of the analog subarrays unchanged, performing a first change of the difference between the phase centers of the first group of the analog subarrays, acquiring second signals received by the first group of the analog subarrays and the difference between the phase centers after the first change of the first group of the analog subarrays, performing a first change of the difference between the phase centers of the second group of the analog subarrays, and acquiring second signals received by the second group of the analog subarrays and the difference between the phase centers after the first change of the second group of the analog subarrays; and estimating a Direction Of Arrival (DOA) of a receiving signal, and directing a center of a receiving beam to the estimated DOA, according to the first signals and the second signals received by the first group of the analog subarrays, the difference between the phase centers before the first change and the difference between the phase centers after the first change of the first group of the analog subarrays, the first signals and the second signals received by the second group of the analog subarrays, the difference between the phase centers before the first change and the difference between the phase centers after the first change of the second group of the analog subarrays.

13. The method according to claim 12, wherein before estimating the DOA of the receiving signal, the method further comprises:

keeping the beam directions of the receiving beams of the first group of the analog subarrays and the second group of the analog subarrays unchanged, performing a second change of the difference between the phase centers of the first group of the analog subarrays, acquiring third signals received by the first group of the analog subarrays and the difference between the phase centers after the second change of the first group of the analog subarrays;

or, keeping the beam directions of the receiving beams of the first group of the analog subarrays and the second group of the analog subarrays unchanged, performing a second change of the difference between the phase centers of the second group of the analog subarrays, acquiring third signals received by the second group of the analog subarrays and the difference between the phase centers after the second change of the second group of the analog subarrays;

wherein estimating the DOA of the receiving signal comprises:
estimating the DOA of the receiving signal, according to the first signals, the second signals and the third signals received by the first group of the analog subarrays, the difference between the phase centers before the first change, the difference between the phase centers after the first change and the difference between the phase centers after the second change of the first group of the analog subarrays, the first signals and the second signals received by the second group of the analog subarrays, the difference between the phase centers before the first change and the difference between the phase centers after the first change of the second group of the analog subarrays;

or, estimating the DOA of the receiving signal, according to the first signals and the second signals received by the first group of the analog subarrays, the difference between the phase centers before the first change and the difference between the phase centers after the first change of the first group of the analog subarrays, the first signals, the second signals and the third signals received by the second group of the analog subarrays, the difference between the phase centers before the first change, the difference between the phase centers after the first change and the difference between the phase centers after the second change of the second group of the analog subarrays.

14. The method according to claim 13, wherein estimating the DOA of the receiving signal comprises:

establishing an equation set with $\sin\theta\cos\phi$, $\sin\theta\sin\phi$ and $\cos\theta$ as unknowns, according to the first signals, the second signals and the third signals received by the first group of the analog subarrays, the difference between the phase centers before the first change, the difference between the phase centers after the first change and the difference between the phase centers after the second change of the first group of the analog subarrays, the first signals and the second signals received by the second group of the analog subarrays, the difference between the phase centers before the first change and the difference between the phase centers after the first change of the second group of the analog subarrays, wherein the $\theta$ is a zenith angle of the DOA, the $\phi$ is an azimuth of the DOA; obtaining the $\sin\theta\cos\phi$, the $\sin\theta\sin\phi$ and the $\cos\theta$ by solving the equation set; and calculating the $\theta$ and the $\phi$ according to the $\sin\theta\cos\phi$, the $\sin\theta\sin\phi$ and the $\cos\theta$;

or, establishing an equation set with $\sin\theta\cos\phi$, $\sin\theta\sin\phi$ and $\cos\theta$ as unknowns, according to the first signals and the second signals received by the first group of the analog subarrays, the difference between the phase centers before the first change and the difference between the phase centers after the first change of the first group of the analog subarrays, the first signals, the second signals and the third signals received by the second group of the analog subarrays, the difference between the phase centers before the first change, the difference between the phase centers after the first change and the difference between the phase centers after the second change of the second group of the analog subarrays; obtaining the $\sin\theta\cos\phi$, the $\sin\theta\sin\phi$ and the $\cos\theta$ by solving the equation set; and calculating the $\theta$ and the $\phi$ according to the $\sin\theta\cos\phi$, the $\sin\theta\sin\phi$ and the $\cos\theta$.

15. The method according to claim 12, wherein, for each group of the analog subarrays, the difference between the phase centers of the two analog subarrays is changed by turning off part of radiators of one of the analog subarrays or part of radiators of the two analog subarrays;

or, for each group of the analog subarrays, the difference between the phase centers of the two analog subarrays is changed, by forming a blocking beam pointed to a non-observable area or forming a beam nulling or a low sidelobe at an observable area, through radiators which need to be turned off in one or both of the two analog subarrays.

16. The method according to claim 12, wherein, when performing the first change of the difference between the phase centers of the first and second group of the analog subarrays respectively, performing the first change on a first dimension of the first group of the analog subarrays; and performing the first change on a second dimension of the second group of the analog subarrays;

or, performing the first change on a second dimension of the first group of the analog subarrays; and performing the first change on a first dimension of the second group of the analog subarrays;

or, performing the first change on first and second dimensions of the first group of the analog subarrays; and performing the first change on one or both of the first dimension and the second dimension of the second group of the analog subarrays;

or, performing the first change on one or both of first and second dimensions of the first group of the analog subarrays; and performing the first change on the first dimension and the second dimension of the second group of the analog subarrays.

17. The method according to claim 12, wherein estimating the DOA of the receiving signal comprises:

determining an objective function, according to the first signals and the second signals received by the first group of the analog subarrays, the difference between the phase centers before change and the difference between the phase centers after change of the first group of the analog subarrays, the first signals and the second signals received by the second group of the analog subarrays, the difference between the phase centers before change and the difference between the phase centers after change of the second group of the analog subarrays; and traversing all desirable DOAs to obtain a value of the objective function corresponding to each of the desirable DOAs, and take a DOA with a smallest value of the objective function as the estimated DOA.

18. The method according to claim 12, wherein estimating the DOA of the receiving signal comprises:

establishing an equation set with $\theta$ and $\phi$ as unknowns, according to the first signals and the second signals received by the first group of the analog subarrays, the difference between the phase centers before change and the difference between the phase centers after change of the first group of the analog subarrays, the first signals and the second signals received by the second group of the analog subarrays, the difference between the phase centers before change and the difference between the phase centers after change of the second group of the analog subarrays; wherein the $\theta$ is a zenith angle of the DOA, the $\phi$ is an azimuth of the DOA; and obtaining the $\theta$ and the $\phi$ by solving the equation set.

19. The method according to claim 4, wherein establishing the equation set with the $\theta$ and the $\phi$ as unknowns comprises:

determining a first difference value and a second difference value, according to the difference between the phase centers before change and the difference between the phase centers after change of the first group of the analog subarrays, and the difference between the phase centers before change and the difference between the phase centers after change of the second group of the analog subarrays, respectively; and establishing the equation set with the $\theta$ and the $\phi$ as unknowns, according to the first signals and the second signals received by the first group of the analog subarrays, the first signals and the second signals received by the second group of the analog subarrays, the first difference value and the second difference value;

wherein, the first difference value is a difference value between the difference between the phase centers after the first change and the difference between the phase centers before the first change, of the first group of the analog subarrays, and the second difference value is a difference value between the difference between the phase centers after the first change and the difference between the phase centers before the first change, of the second group of the analog subarrays;

or, the first difference value is a difference value between the difference between the phase centers before the first change and the difference between the phase centers after the first change, of the first group of the analog subarrays, and the second difference value is a difference value between the difference between the phase centers before the first change and the difference between the phase centers after the first change, of the second group of the analog subarrays.

20. A non-transitory computer-readable storage medium storing a computer program which, when executed by a processor, cause the processor to perform the method for realizing the beam alignment according to claim 12.

21. A method for realizing beam alignment, comprising:
in response to a reception of first signals with effective signal strengths through a first group of analog subarrays, a second group of the analog subarrays and a third group of the analog subarrays by adopting receiving beams having a same beam direction, acquiring the first signals received by the first group of the analog subarrays, the first signals received by the second group of the analog subarrays, the first signals received by the third group of the analog subarrays, a difference between phase centers of two analog subarrays in the first group of the analog subarrays, a difference between phase centers of two analog subarrays in the second group of the analog subarrays, and a difference between phase centers of two analog subarrays in the third group of the analog subarrays; wherein each of the first, second and third group of the analog subarrays comprises two analog subarrays with a same polarization mode;

keeping the beam directions of the receiving beams of the first group of the analog subarrays, the second group of the analog subarrays and the third group of the analog subarrays unchanged, performing a change of the difference between the phase centers of the first group of the analog subarrays, acquiring second signals received by the first group of the analog subarrays and the difference between the phase centers after change of the first group of the analog subarrays, performing a change of the difference between the phase centers of the second group of the analog subarrays, acquiring second signals received by the second group of the analog subarrays and the difference between the phase centers after change of the second group of the analog subarrays, and performing a change of the difference between the phase centers of the third group of the analog subarrays, acquiring second signals received by the third group of the analog subarrays and the difference between the phase centers after change of the third group of the analo g subarrays; and estimating a Direction Of Arrival (DOA) of a receiving signal, and directing a center of a receiving beam to the estimated DOA, according to the first signals and the second signals received by the first group of the analog subarrays, the difference between the phase centers before change and the difference between the phase centers after change of the first group of the analog subarrays, the first signals and the second signals received by the second group of the analog subarrays, the difference between the phase centers before change and the difference between the phase centers after change of the second group of the analog subarrays, the first signals and the second signals received by the third group of the analog subarrays, the difference between the phase centers before change and the difference between the phase centers after change of the third group of the analog subarrays.

22. The method according to claim 21, wherein estimating the DOA of the receiving signal comprises:
establishing an equation set with $\sin\theta\cos\phi$, $\sin\theta\sin\phi$ and $\cos\theta$ as unknowns, according to the first signals and the second signals received by the first group of the analog subarrays, the difference between the phase centers before change and the difference between the phase centers after change of the first group of the analog subarrays, the first signals and the second signals received by the second group of the analog subarrays, the difference between the phase centers before change and the difference between the phase centers after change of the second group of the analog subarrays, and the first signals and the second signals received by the third group of the analog subarrays, the difference between the phase centers before change and the difference between the phase centers after change of the third group of the analog subarrays; wherein the $\theta$ is a zenith angle of the DOA, the $\phi$ is an azimuth of the DOA;

obtaining the $\sin\theta\cos\phi$, the $\sin\theta\sin\phi$ and the $\cos\theta$ by solving the equation set; and calculating the $\theta$ and the $\phi$ according to the $\sin\theta\cos\phi$, the $\sin\theta\sin\phi$ and the $\cos\theta$.

23. The method according to claim 21, wherein, for each group of the analog subarrays, the difference between the phase centers of the two analog subarrays is changed by turning off part of radiators of one of the analog subarrays or part of radiators of the two analog subarrays;

or, for each group of the analog subarrays, the difference between the phase centers of the two analog subarrays is changed, by forming a blocking beam pointed to a non-observable area or forming a beam nulling or a low sidelobe at an observable area, through radiators which need to be turned off in the part of radiators of one of the analog subarrays or in both of the two analog subarrays.

24. The method according to claim 23, wherein, when performing a change of the difference between the phase centers of the first, second and third group of the analog subarrays respectively, performing a change on a first dimension of the first group of the analog subarrays; performing a change on a second dimension of the second group of the analog subarrays; and performing a change on one or both of the first and second dimensions of the third group of the analog subarrays;

or, performing a change on a second dimension of the first group of the analog subarrays; performing a change on a first dimension of the second group of the analog subarrays; and performing a change on one or both of the first and second dimensions of the third group of the analog subarrays;

or, performing a change on one or both of first and second dimensions of the first group of the analog subarrays; performing a change on the first dimension of the second group of the analog subarrays; and performing a change on the second dimension of the third group of the analog subarrays;

or, performing a change on one or both of first and second dimensions of the first group of the analog subarrays; performing a change on the second dimension of the second group of the analog subarrays; and performing a change on the first dimension of the third group of the analog subarrays;

or, performing a change on a first dimension of the first group of the analog subarrays; performing a change on one or both of the first dimension and a second dimension of the second group of the analog subarrays; and performing a change on the second dimension of the third group of the analog subarrays;

or, performing a change on a second dimension of the first group of the analog subarrays; performing a change on one or both of a first dimension and the second dimension of the second group of the analog subarrays; and performing a change on the first dimension of the third group of the analog subarrays.

25. A non-transitory computer-readable storage medium storing a computer program which, when executed by a processor, cause the processor to perform the method for realizing the beam alignment according to claim 21.

* * * * *